US012682150B2

(12) United States Patent
Chauvin et al.

(10) Patent No.: US 12,682,150 B2
(45) Date of Patent: Jul. 14, 2026

(54) SYSTEM AND METHOD FOR TRANSCRIBING AUDIBLE INFORMATION

(71) Applicant: Logitech Europe S.A., Lausanne (CH)

(72) Inventors: Nicolas Chauvin, Jouxtens-Mezery (CH); Yan Chetelat, Le Landeron (CH); Anna Puchalska, Rumia (PL); Evan Patrick Kelly, Crissier (CH); Curtis Devin Brown, San Jose, CA (US); Robin Antero Olof Piispanen, Lakeway, TX (US); Madelene Rae Stanley, Vancouver, WA (US)

(73) Assignee: Logitech Europe S.A., Lausanne (CH)

( * ) Notice: Subject to any disclaimer, the term of this patent is extended or adjusted under 35 U.S.C. 154(b) by 48 days.

(21) Appl. No.: 18/138,717

(22) Filed: Apr. 24, 2023

(65) Prior Publication Data

US 2024/0354490 A1    Oct. 24, 2024

(51) Int. Cl.
*G06F 3/048*     (2013.01)
*G06F 40/166*    (2020.01)
*G06F 40/279*    (2020.01)
*G06F 40/42*     (2020.01)

(52) U.S. Cl.
CPC .......... *G06F 40/166* (2020.01); *G06F 40/279* (2020.01); *G06F 40/42* (2020.01)

(58) Field of Classification Search
CPC ...... G06F 40/166; G06F 40/279; G06F 40/42; G06F 40/253; G06F 40/263; G06F 40/30; G06F 40/58
See application file for complete search history.

(56) References Cited

U.S. PATENT DOCUMENTS

| | | | | |
|---|---|---|---|---|
| 2001/0029455 A1* | 10/2001 | Chin | ...................... | G06F 40/58 |
| | | | | 704/277 |
| 2017/0091174 A1* | 3/2017 | Rubin | ..................... | G06F 40/51 |
| 2021/0397793 A1* | 12/2021 | Li | .......................... | G06F 40/166 |
| 2022/0284884 A1* | 9/2022 | Tongya | ................ | G06F 40/242 |
| 2022/0377035 A1* | 11/2022 | Shapiro | ................ | H04L 51/046 |
| 2023/0096357 A1* | 3/2023 | Dorn | ....................... | G10L 21/00 |
| | | | | 704/270 |
| 2023/0306207 A1* | 9/2023 | Bojar | ..................... | G10L 15/19 |

* cited by examiner

*Primary Examiner* — Aleksey Olshannikov
(74) *Attorney, Agent, or Firm* — Patterson + Sheridan, LLP

(57) ABSTRACT

Embodiments herein include a processing system and method for transcribing audible information, including converting audible information or data received from a user into alphanumeric data. The alphanumeric data can be processed allowing a user to provide input that improves of the accuracy of the alphanumeric data, facilitates the transfer of the alphanumeric data to other electronic devices by a computer or other electronic device, and/or improves the communicative or expressive properties of the alphanumeric data in an electronic communication that is provided to one or more users. In some embodiments, the transcribed and/or translated text can be automatically formatted by a program for use in a software application. More specifically embodiments of the present application disclose a system and program that can embellish transcribed text to alert and provide suggestions for the correction of potentially inaccurate transcribed and/or translated text, and/or provide potential emojis to add into or replace text.

15 Claims, 20 Drawing Sheets

500

502
OPTIONAL, INITIATE COLLECTION SOFTWARE

504
RECEIVE USER INPUT DATA AND GENERATE AN AUDIO DATA

506
PROCESS USER INPUT

508
TRANSCRIBE AUDIO DATA INTO TEXT

510
GENERATE POTENTIAL EMOJI LIST

512
GENERATE EMBELLISHED TEXT

514
DISPLAY EMBELLISHED TEXT

516
RECEIVE USER INPUT

518
UPDATE EMBELLISHED TEXT WITH EMOJI TO FORM COMPOSITION TEXT

520
TRANSMIT COMPOSITION TEXT

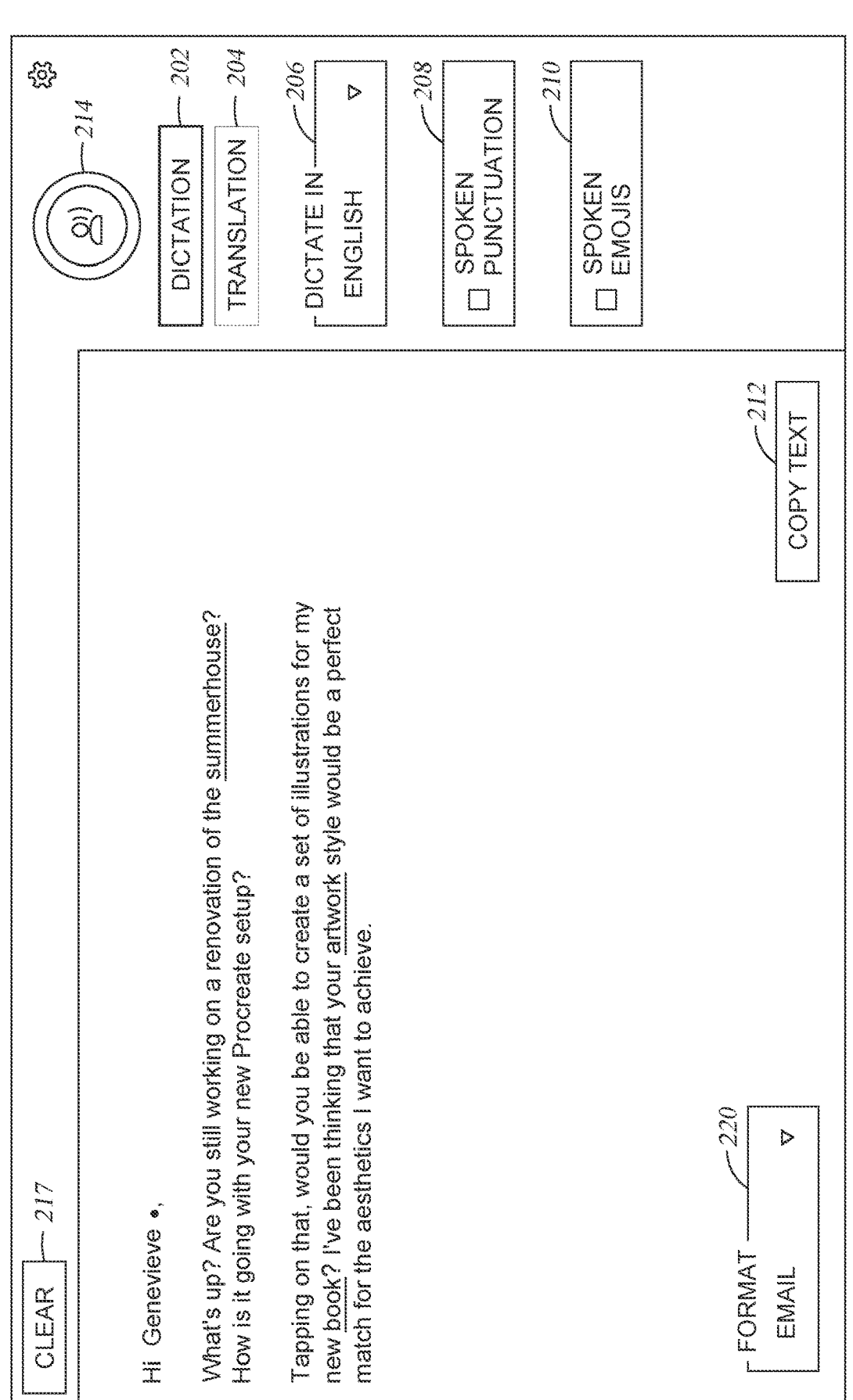

CLEAR — 217

Hi Genevieve •,

What's up? Are you still working on a renovation of the summerhouse? How is it going with your new Procreate setup?

Tapping on that, would you be able to create a set of illustrations for my new book? I've been thinking that your artwork style would be a perfect match for the aesthetics I want to achieve.

FORMAT — 220
EMAIL  ▽

200 —

DICTATION — 202
TRANSLATION — 204
DICTATE IN — 206
ENGLISH  ▽
SPOKEN PUNCTUATION — 208
SPOKEN EMOJIS — 210
COPY TEXT — 212
214

702
INITIATE COLLECTION SOFTWARE

704
RECEIVE USER INPUT DATA

706
PROCESS USER INPUT

708
TRANSCRIBE AUDIO DATA INTO TEXT

710
GENERATE RELATED WORDS AND/OR POTENTIAL EMOJI LIST

712
GENERATE EMBELLISHED TEXT

714
DISPLAY EMBELLISHED TEXT

716
RECEIVE USER INPUT

718
UPDATE EMBELLISHED TEXT WITH
EMOJI TO FORM COMPOSITION TEXT

720
TRANSMIT COMPOSITION TEXT

900 ⟍

701
PERFORM TEXT EMBELLISHMENT PROCESS

902
GENERATE TRANSLATED TEXT

904
DISPLAY EMBELLISHED AND TRANSLATED TEXT

906
RECEIVE USER INPUT

908
UPDATE EMBELLISHED TEXT AND RE-TRANSLATE
UPDATED EMBELLISHED TEXT

910
TRANSMIT THE RE-TRANSLATED UPDATED EMBELLISHED TEXT

912
FORM TRANSLATED COMPOSITION TEXT

914
PROVIDE TRANSLATED COMPOSITION
TEXT TO A SOFTWARE APPLICATION

1300

701
PERFORM TEXT EMBELLISHMENT PROCESS

1304
FORMAT EMBELLISHED TEXT

1306
DISPLAY EMBELLISHED TEXT

1308
RECEIVE USER INPUT

1310
UPDATE EMBELLISHED TEXT TO FORM COMPOSITION TEXT

1312
TRANSMIT EMBELLISHED TEXT

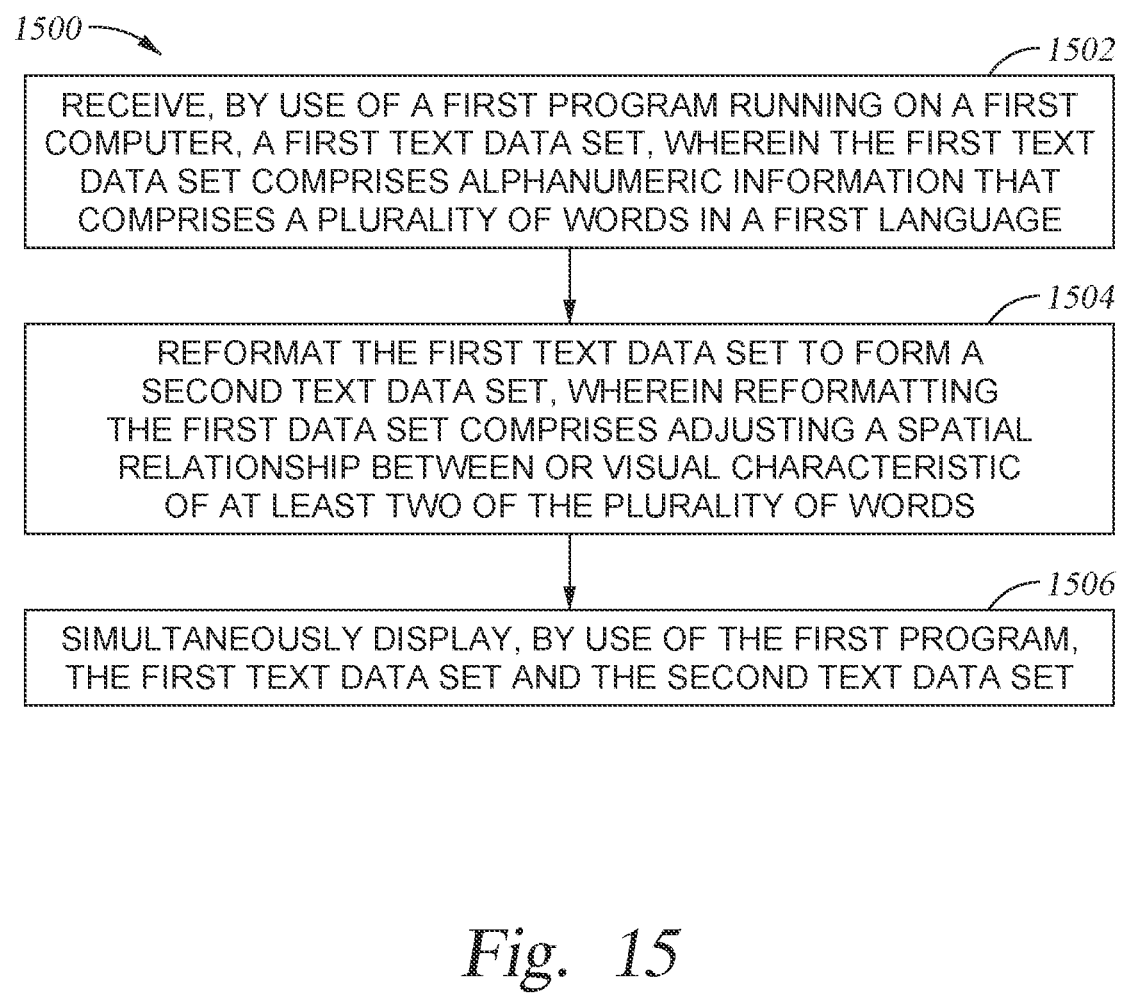

1500

1502

RECEIVE, BY USE OF A FIRST PROGRAM RUNNING ON A FIRST COMPUTER, A FIRST TEXT DATA SET, WHEREIN THE FIRST TEXT DATA SET COMPRISES ALPHANUMERIC INFORMATION THAT COMPRISES A PLURALITY OF WORDS IN A FIRST LANGUAGE

1504

REFORMAT THE FIRST TEXT DATA SET TO FORM A SECOND TEXT DATA SET, WHEREIN REFORMATTING THE FIRST DATA SET COMPRISES ADJUSTING A SPATIAL RELATIONSHIP BETWEEN OR VISUAL CHARACTERISTIC OF AT LEAST TWO OF THE PLURALITY OF WORDS

1506

SIMULTANEOUSLY DISPLAY, BY USE OF THE FIRST PROGRAM, THE FIRST TEXT DATA SET AND THE SECOND TEXT DATA SET

Fig.  15

SYSTEM AND METHOD FOR TRANSCRIBING AUDIBLE INFORMATION

BACKGROUND

Field

Embodiments of the present invention generally relate to a method and system for converting audio into text.

Description of the Related Art

A typical audio to text application converts speech into text. The application generates audio data based on captured speech and provides the audio data to a server on the cloud. The server on the cloud contains a program that then transcribes the audio data into text data. The server returns the text data to the application and the application displays the text onto a display.

However, the server on the cloud is unable to distinguish words that have the same or similar pronunciations, such as homophones. For example, the server is unable to distinguish the difference between the words "see" and "sea." Resulting in inaccurate transcriptions.

Additionally the server may also, after transcribing the text, translate the text to a different language. However, the server is unable to identify idioms or situations where a word takes on a different meaning based on context (mononyms) in different languages. This is problematic because the user cannot read and/or understand text returned in a different language to recognize and correct the errors. This may result in inaccurate translations.

Accordingly, there is a need in the art for a novel audio to text translation application that can detect words with the same or similar pronunciations, and allow a user to recognize/correct inaccurate translations.

SUMMARY

In some embodiments, a method of transcribing is provided. The method includes opening an application on a first electronic device; receiving a triggering event that causes a program to open on the first electronic device; receiving first text data, wherein the first text data comprises alphanumeric information that comprises a plurality of words in a first language and a quality score for each of the plurality of words; determining that one or more of the plurality of words in the first text data have a quality score less than a threshold quality score; generating second text data comprising a list of related words corresponding to the one or more of the plurality of words in the first text data having a quality score less than the threshold quality score; and displaying the plurality of words of the first text data in the program, wherein each of the displayed one or more of the plurality of words in the first text data having a quality score less than a threshold quality score comprise an embellished text that comprises at least one characteristic that is different from each of the displayed plurality of words in the first text data that have a quality score greater than the threshold quality score.

In some embodiments a method of transcribing is provided. The method includes opening an application on a first electronic device; receiving a triggering event that causes a program to open on the first electronic device; receiving first text data, wherein the first text data comprises alphanumeric information that comprises a plurality of words in a first language and a quality score for each of the plurality of words; determining that one or more of the plurality of words in the first text data have a quality score less than a threshold quality score; generating second text data comprising a list of related words corresponding to the one or more of the plurality of words in the first text data having a quality score less than the threshold quality score; forming a curated list of words, wherein forming the curated list of words comprises determining at least one of: an order of the list of related words; and a presentation list of words that includes at least a portion of the list of related words; and displaying the plurality of words of the first text data in the program, wherein one or more of the plurality of words in the first text data have a quality score less than a threshold quality score, and a curated list of words is associated with each of the one or more of the plurality of words.

In some embodiments, method for transcribing is provided. The method includes opening an application on a first electronic device; receiving a triggering event that causes a program to open on the first electronic device; receiving first text data, wherein the first text data comprises alphanumeric information that comprises a plurality of words in a first language; determining that one or more of the plurality of words in the first text data are associated with an emoji; generating a second text data comprising a list of related emojis corresponding to the one or more of the plurality of words that are associated with an emoji; and displaying the plurality of words of the first text data in the program, wherein each of the displayed one or more of the plurality of words in the first text data associated with an emoji comprise an embellished text that comprises at least one characteristic that is different from each of the displayed plurality of words in the first text data that are not associated with an emoji.

In some embodiments, method for transforming data is provided. The method includes receiving a first text data set, wherein the first text data set comprises alphanumeric information that comprises a plurality of words in a first language; generating a second text data set, wherein the second text data set comprises the first text data set translated from the first language to a second language; generating a third text data set, wherein the third text data set is formed by translating the second text data set from the second language to the first language; and simultaneously displaying, by use of a first program running on a first computer, the second text data set and the third text data set.

In some embodiments, method for transforming data is provided. The method includes opening an application on a first computer; receiving a triggering event that causes a first program, running on the first computer, to open; receiving, by use of the first program, a first text data set, wherein the first text data set comprises alphanumeric information that comprises a plurality of words in a first language; reformatting the first text data set to form a second text data set, wherein reformatting the first text data set comprises adjusting a spatial relationship between or visual characteristic of at least two of the plurality of words; and simultaneously displaying, by use of the first program, the first text data set and the second text data set.

In some embodiments, method for transcribing audible information is provided. The method includes receiving, by a program implemented on a computer, first text data set, wherein the first text data set comprises alphanumeric information that comprises a plurality of words in a first language; formatting, by the program, the first text data set based on an application the first text data set is to be transmitted to; and transmitting the first text data set to the application.

In some embodiments, method for transcribing is provided. The method includes receiving, by a program implemented on an electronic device, text data and metadata associated with the data from a first user, wherein the text data comprises alphanumeric information that comprises a plurality of words in a first language; and streaming, by the program, the plurality of words to a second user, wherein the program alters one or more of the streamed plurality of words based on a comparison between at least one of the text data and metadata with information stored in a database, wherein the information stored in the database comprises a list of words or phrases that are to be altered when presented in a stream of words.

In some embodiments, method for transcribing is provided. The method includes receiving, by a program implemented on an electronic device, text data and metadata associated with the data from a first user, wherein the text data comprises alphanumeric information that comprises a plurality of words in a first language; and streaming, by the program, the plurality of words of to a second user, wherein the program translates the plurality of words into a second language.

In some embodiments, method for transcribing is provided. The method includes receiving, by a program implemented on an electronic device, text data and metadata associated with the data from a first user, wherein the text data comprises alphanumeric information that comprises a plurality of words in a first language; and streaming, by the program, the plurality of words of to a second user, wherein the program alters one or more of the plurality of words based on a comparison between the text data and metadata and information stored in a database and translates the plurality of words into a second language.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIGS. 6A-6B illustrate a GUI displaying embellished text transcribed from audible information including embellished words that may be associated with an emoji.

FIG. 15 illustrates a method of transcribing audio to text, and translating the text to a format according to certain embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments herein include a processing system and method for transforming information, which includes converting audible information or data received from a user into alphanumeric data. The alphanumeric data can then be further processed to allow a user to provide input that will allow the accuracy of the generated alphanumeric data to be improved, the transfer of the alphanumeric data to other electronic devices faster and more easy to perform by use of a computer or other electronic device, and/or improve the communicative or expressive properties of the generated alphanumeric data that is to be provided in an electronic communication that is to be provided to one or more users. Embodiments disclosed herein can include a processing system and method for transcribing audible information into alphanumeric data. In some embodiments, the transcribed and/or translated text can be automatically formatted by a program for subsequent use in a software application. More specifically embodiments of the present application disclose a system and program that can generate embellish text converted from text data, which in some cases is created from a text file or by transcribing the audible information included in received audio data received from a user, to alert and provide suggestions for the correction of potentially inaccurate transcribed and/or translated text, and/or detect words and/or phrases that may be associated with an emoji and provide potential emojis to add into or replace text.

In general, audible information can include spoken-words and related sounds that are provided from an audio source, such as speech provided from a user. In some cases, audible information is used as part of a communication, as part of the documentation of ideas or concepts, or other useful application of generated information.

Figure 1:
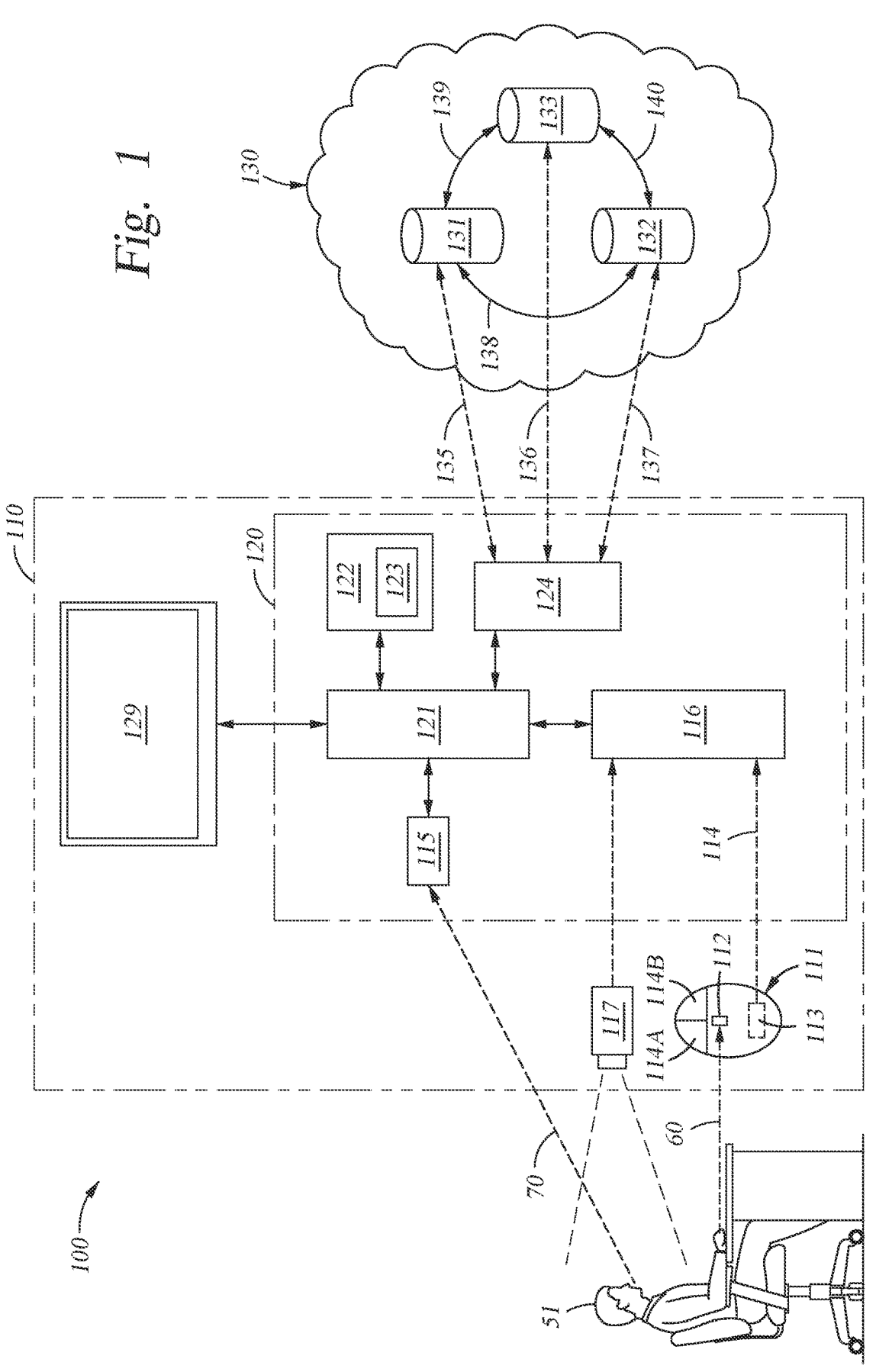
FIG. 1 illustrates a processing system according to certain embodiments

FIG. 1 illustrates a processing system according to certain embodiments. FIG. 1 illustrates a processing system 100 including a computing system 110. The computing system 110 may include a computer 120 coupled to the cloud 130. The cloud 130 will generally include a network of remote servers hosted on the internet to store, manage, and process data, rather than a local server or a personal computer. The computer 120 may include an audio assembly 115, a video sensor 117, such as a camera, a transceiver 116, a processor 121, a memory 122 and an input/output (I/O) device 124, such as a modem. The computer 120 may be a personal computer (PC), desktop computer, a laptop, a tablet, a smartphone, or the like.

A program 123 is stored in memory 122 and may be configured to provide instructions to the processor 121 to perform one or more of the methods described herein, such as alter, translate and/or correct text formed from the audible information. In one example, text may be altered by embellishing or replacing text formed from the audible information with a symbol, such as an emoji. The memory 122 may include volatile and non-volatile memories. The processor 121 may comprise an application-specific integrated circuit (ASIC) device, a computer processing unit (CPU), a system on chip (SOC), or any other processor unit known in the art that is configured to execute the various programs, such as program 123, stored in memory 122. In certain embodiments, the program 123 may be a cloud based service or located on a personal machine, as described above.

The program 123 may be initiated by a triggering event via input received from a user input device 111, such as a mouse or a keyboard. The user input device 111 may include an initiate button 112 and a transceiver 113. In one example, the user input device 111 is a mouse that includes a standard mouse left button 114A, standard mouse right button 114B, the initiate button 112, the transceiver 113 and other standard mouse components. During operation, the triggering event may include a user provided input 60, such as the user 51 pressing the button 112. The user 51 may then provide an input 70 to the computing system 110 by providing audible information to the audio assembly 115. The audio assembly 115 can include a microphone (not shown) or other similar detection device that is configured to detect audible sounds provided from an audio source.

Based on the program 123 running on the computer 120, the processor 121 may cause audio data to be generated from the user input 70 captured by the audio assembly 115. The program 123 may then cause the audio data to be provided to one or more devices within the cloud 130. The one or more devices within the cloud 130 may include a first device 131, a second device 132, and a third device 133. The first device 131 and the second device 132 may be coupled via communication link 138. The first device 131 and the third device 133 may be coupled via communication link 139. The second device and the third device may be coupled via communication link 140.

In some embodiments, the program 123 may run in the background on application being accessed by multiple users. This allows the program 123 to capture audio data from multiple users at once. In some embodiments, the audio data may also be streamed to other users' devices and/or to a moderator supervising the communication between two or more users. In some embodiments, during online gaming, the audio data may be live streamed from one user to another, and to the moderator with the goal of providing information relating to the audible or non-audible communications being provided between users. In one example, during online gaming, the audio data may be live streamed from one user to another, and to the moderator with the goal of detecting and identifying offensive language (e.g., profanity or derogatory language) between users. For example, offensive language may include a pejorative, slur, or derogatory term is a word or grammatical form expressing a negative or a disrespectful connotation, a low opinion, or a lack of respect toward someone or something. It is also used to express criticism, hostility, or disregard.

The first device 131 may comprise a server hosted on the internet including a first server program configured to convert the audio data into first text data by transcribing the audible information included in the audio data. The audio data may be formed in an audio file format, a data stream, a data object, or the like. The first text data may be a formed in a text file format, as a text object, a JavaScript Object Notation (JSON) object, a metadata and text object, a data stream or the like. In one example, a translation may include audible information that is provided in English which is then translated into Chinese (FIG. 10) or Spanish.

The first text data may also be transmitted to the second device 132 by use of the program 123 executed by the processor 121 via I/O device 124 and communication link 137. The second device 132 may include a second server that includes a second server program that when executed by a processor 121 is configured to generate text data, which is often referred to herein as a second text data, that includes a list of related words for each word found in the first text data. The second text data file may be a formed in a text file format, as a text object, a JavaScript Object Notation (JSON) object, a metadata and text object, a data stream or the like. The list of related words may comprise words that sound alike, but have a different meaning, such as homophones. Additionally or alternatively, the second server program of the second device 132 may identify the words in the first text data that are associated with an emoji, and generate a list of potential emojis for each word associated with an emoji. It is believed that emojis are helpful to convey a desired meaning in communications since they can add contextual or additional emotional meaning to the communication, and also can help shorten the amount of information required to be transferred in a digital communication. The second device 132 may transmit the list(s) of related words and/or emojis to the computer 120.

If the program 123 is in translation mode (FIG. 2B), the program 123 may request that the third device 133 generate text data, which is referred to herein as the third text data. The third text data may be in a text file format, as a text object, a JavaScript Object Notation (JSON) object, a metadata and text object, a data stream or the like. The third device 133 is a third server including a third server program and a fourth server program that is different from the third server program running on the first device 131. The third server program is configured to generate the third text data by generating a translation of the first text data from a first language, captured by the audio assembly, into a second language, and transmit the third text data, back to the computer 120. In certain embodiments, the fourth server program included on the third device 133 may also be configured to generate a fourth text data that includes translating the transcribed text in the third text data back to the first language. The fourth text data file may be a formed in a text file format, as a text object, a JavaScript Object Notation (JSON) object, a metadata and text object, a data stream or the like The third device 133 may transmit the third text data and/or fourth text data back to the computer 120. As will discussed further below, the program 123 and processor 121 may display the first text data with the embellished text, the second text data, the third text data, and the fourth text data on a display 129.

Figure 2A:
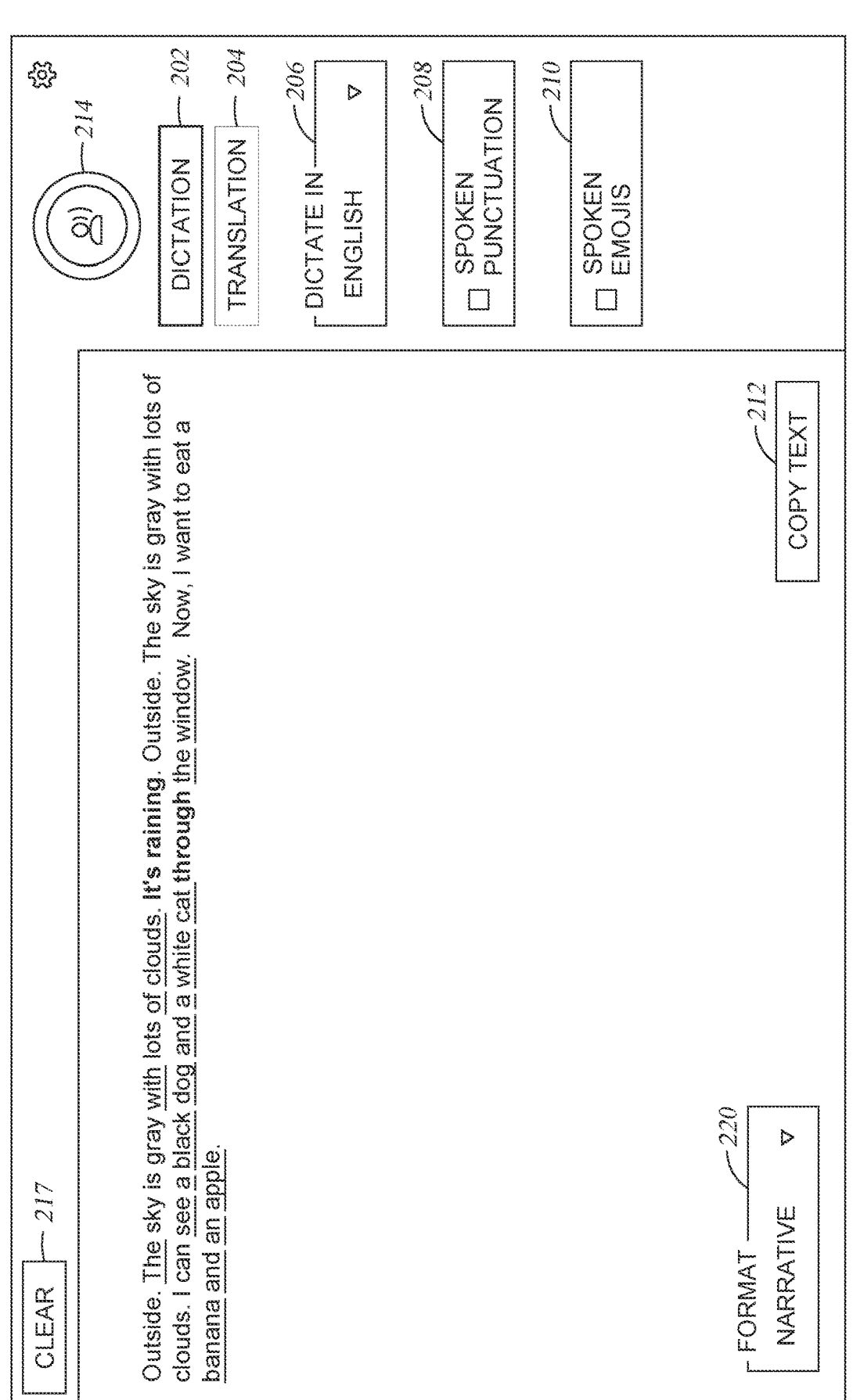
FIGS. 2A-2B illustrate a graphical user interface (GUI) according to certain embodiments
Figure 2B:
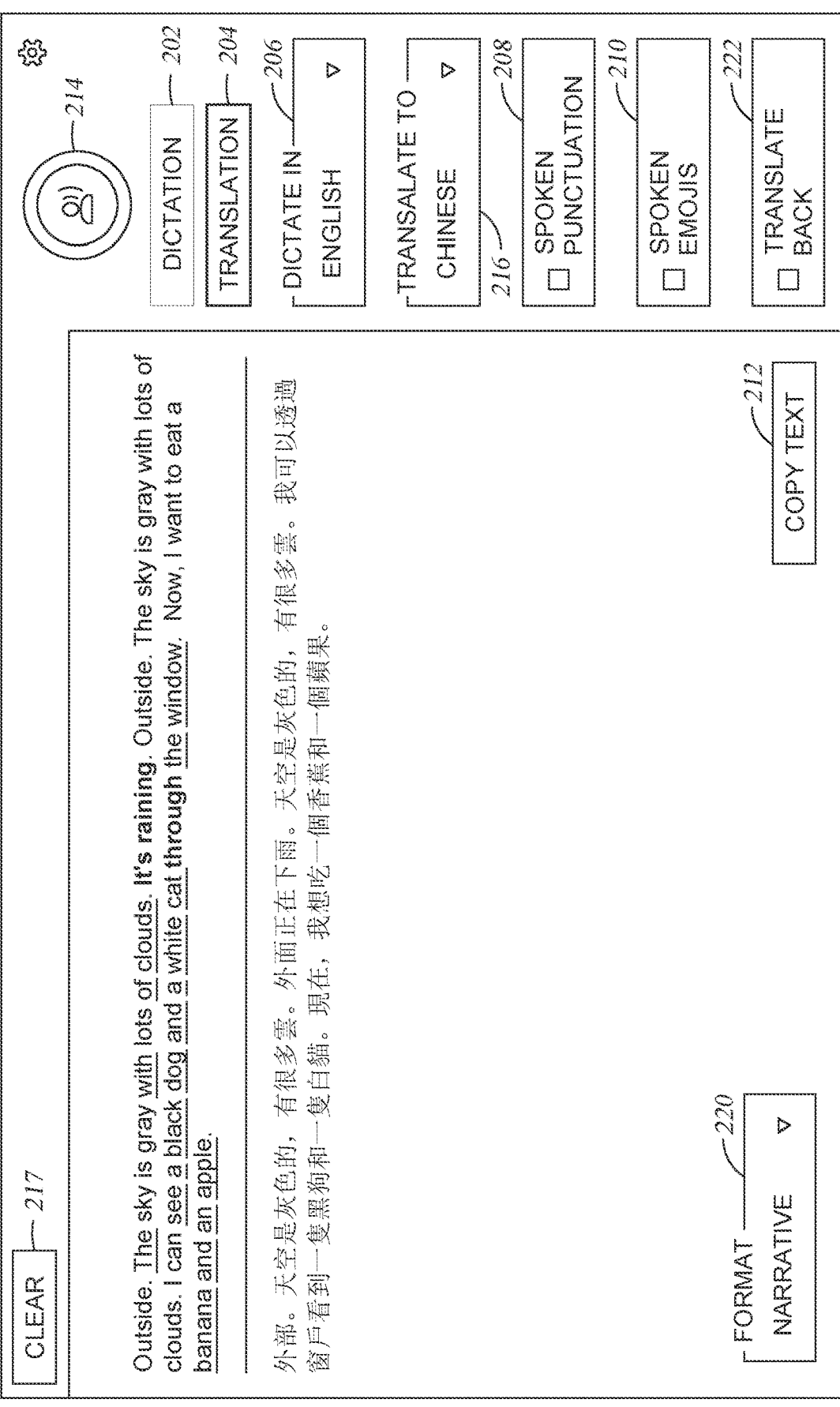

FIGS. 2A-2B illustrate a graphical user interface (GUI) 200 according to certain embodiments. During operation the GUI 200 may be shown on the display 129 of the computing system 110. The GUI 200 includes transcribed text based on the mode selected by the user 51.

The GUI 200 may include a record prompt 214, a dictation prompt 202, and a translation prompt 204. If the dictation prompt 202 is selected, the program 123 is placed in dictation mode (FIG. 2A). A dictation language, which relates to the language in which the user input 70 will be provided, can be selected from a drop-down menu included in a dictate prompt 206. The user 51 may also indicate if it is dictating punctuation by checking the box in a spoken punctuation prompt 210. The user 51 may also indicate if it is dictating emojis by checking the box in a spoken emojis prompt 210. Once the user 51 makes selections using the various prompts, the user 51 may select the recording prompt 214 to begin dictation (i.e., the receipt of the user input 70), and re-select the recording prompt 214 to stop recording. The GUI 200 also includes a clear prompt 217 and a format prompt 220. When the clear prompt 217 is selected by the user 51, the text displayed in the GUI 200 is deleted. The format prompt 220 allows the user 51 to select the desired format of the text that is received in the first text data received from the first server 131. The selected format can be based on where the translated text is to be used, such in a word processing document, an email, texting program, presentation program, or other useful software application. In some embodiments, the text may be automatically formatted based on the software application being accessed by the user 51.

The text displayed in the GUI 200 may be copied when the user 51 selects the copy text prompt 212. The copied text may then be pasted in a software application such as a word processing application, an email web application, a slideshow presentation application, or the like. Alternatively, the dictated text may be displayed directly into a software application being accessed by the user 51.

As illustrated in FIG. 2A, if the dictation prompt 202 is selected, the GUI 200 will only display embellished text dictated by the user 51 in the language selected by the user 51 (i.e., the first text data). In certain embodiments, the embellished text is streamed to another user and/or a moderator. This allows users to receive the embellished text and allows for the moderator(s) to review the embellished text. As will be discussed further below, the embellished text is used to indicate words or phrases that have a quality score, which can be provided with a transcribed text data provided from the first server program, that are below a threshold quality score that is stored in memory. For example, words below the threshold quality level may be embellished by altering or adjusting a characteristic (e.g., visual characteristic) of the embellished text, which can include bolding, italicizing, underlining, highlighting, blurring, or other methods of distinguishing text with first text data from each other. Embellished text, which is often referred to herein as an embellished term, can include a word, a group of words (e.g., hyphenated words) or phrase that have been highlighted due to a characteristic. In some embodiments, the user/moderator receiving the embellished text specifics to the program 123 how terms are to-be embellished. For example, instructions defined by the user/moderator, which are stored in the memory 122, are used to specify that embellished text should be underlined.

In some embodiments, the embellished text may indicate words, groups of words or phrases in the text that may be associated with an emoji. For example, words associated with an emoji may be embellished by bolding, italicizing, underlining, highlighting, or the like. Phrases associated with an emoji may be embellished by bolding, italicizing, underlining, or highlighting the entire phrase or including a dot or another symbol at the end of the phrase.

In some embodiments, the embellished text may also include words, groups of words or phrases in the text that are considered offensive, such as profanity or derogatory statements. For example, words, groups of words or phrases in the text that are considered offensive may be embellished by bolding, italicizing, underlining, highlighting, or alternately reducing its font size (e.g., deemphasize the offensive language), or the like as a way to signify the inappropriateness of the use of the words, groups of words or phrases, and/or allow a moderator of the conversation to note the use of the offensive elements of the communication. In another embodiment, offensive text may be replaced by an emoji. In embodiments in which the program 123 streams the embellished text to another user or moderator, the another user or moderator may specify how the offensive text is altered. For example, the another user or moderator may specify the offensive language should be highlighted, capitalized, bolded, underlined, or the like. In another example, the another user or moderator may specify that the offensive language should be removed or replaced by an emoji. For example if the user is under the age of 18 (e.g., 12 years old) the user may specify that offensive language is removed or replaced by an emoji. in the program 123. In one example the program 123 uses instructions stored in the memory 122 used to specify the translate to language.

In certain embodiments, words below the threshold quality score and words and phrases associated with an emoji may both be embellished. Words below the threshold quality score and words and/or phrases associated with an emoji may be embellished in different manners so that a user 51 can distinguish a difference between these different determined characteristics of the highlighted word or phrase. For example, as illustrated in FIGS. 2A-2B, the words below the quality score threshold are bolded and words associated with an emoji are underlined. In another example, words below the threshold quality score and words associated with an emoji may be embellished in the same style, but using different colors. Words below the threshold confidence level may be embellished by coloring of the words' font(s), highlighting the words, underlining the words, or the like in a first color. Words associated with an emoji may be embellished by coloring the font(s) within the words or phrases, highlighting the words or phrases, or underlining the words or phrases, or the like in a second color. In some embodiments, if a word has a quality score below the threshold value, and is associated with an emoji, it may be embellished in the same manner as the words below the threshold quality level.

In certain embodiments, words below the threshold quality score, words and phrases associated with an emoji, and words, groups of words or phrases that are considered offensive may each be embellished. For example, the words below the quality score threshold are bolded, words associated with an emoji are underlined, and words or phrases in the text that are considered offensive may be italicized, colored, or place in a different sized font. In another example, words below the threshold quality score, words associated with an emoji, and words or phrases in that are considered offensive may be embellished in the same style, but using different colors. Words below the threshold confidence level may be embellished by coloring of the words' font(s), highlighting the words, underlining the words, or the like in a first color. Words associated with an emoji may be embellished by coloring the font(s) within the words or phrases, highlighting the words or phrases, or underlining the words or phrases, or the like in a second color. Words or phrases that are considered offensive may be embellished by coloring the font(s) within the words or phrases, highlighting the words or phrases, or underlining the words or phrases, or the like in a third color.

In certain embodiments, the offensive language may be replaced with an emoji (such as a danger sign) or simply not including the offensive language in the embellished text. A base list of baseline offensive language, such as offensive words or phrases, may be stored in a database or table that is accessible by the program 123 so that the program 123 can compare and determine if a word or phrase is considered to be offensive. The program 123 determines that a word or phrase is offensive if is an exact match of a base list word or phrase or a variant of a base list word or phrase. For example, if the user pluralizes base list word or phrase, or adds a suffix to a base list word or phrase (such as adding a 'y' or 'ey' to the end), the program 123 will still detect use of offensive language. The database may be accessible by the program 123 locally or externally (i.e., stored in the cloud). In one example, the database is stored in the memory 122 of the computer 120. In another example, resides in a streaming application accessed by multiple users. For example, during online gaming, the database may reside in the game being played. The base list of offensive language may be populated by the user, may be pre-determined, or may be added from a list external to the database such as a list of offensive language posted on the internet by an organization. In some embodiments, the base list of offensive language stored in a database or table can be continually updated by the user or by use of artificial intelligence and machine learning techniques.

In certain embodiments, if multiple users are talking, the program 123 may additionally embellish text based on which user is talking. For example, the program 123 may return text in different font sizes or types for each user. In another embodiment, the program 123 may separate embellished text for each user. For example, the program may generate a separate script including embellished text dictated by each individual user. Further the program 123 may embellish text dictated by one of many users that are conversing. For example, the embellished text dictated by the user that is leading the meeting may have a larger font size or different font type than the embellished text dictated by other users. Advantageously, this allows a moderator or some else view the transcription to easily determine, for example, a user that used profanity or derogatory language. For example, a moderator or other users can rate other users based on their interactions or even ban users for continuous offensive language.

On the other hand, as will be discussed further below, the user 51 may select the translation prompt 204 (FIG. 2B) within the GUI 200. When the user 51 selects the translation prompt, the dictated text is translated into a language selected in the translate to prompt 216. As illustrated in FIG. 2B, when the user selects the translate to prompt 216, the GUI 200 will display the embellished text, and the dictated text translated into a different language (i.e., the third text data). In certain embodiments, the program 123 may live stream the translated text to another user or moderator. In embodiments in which the program 123 live streams the translated text to another user or moderator, the another user or moderator may specify the translate to language in the program 123. In one example the 123 uses instructions stored in the memory 122 used to specify the translate to language. In certain embodiments, the GUI 200 may also display text translated back from the language selected in the translate to prompt 216 back to the language selected in the dictate in prompt 206 if a translate back prompt 222 is checked (not shown).

Embellishing Transcribed Words Example

In an effort to improve the accuracy of generated alphanumeric data, the program 123 running on the computer 120 can be configured to cause words within a transcribed text data to be embellished to help highlight words or phrases that may have been incorrectly transcribed. To further improve the accuracy of the generated alphanumeric data the program 123 may also cause a list(s) of related words to be provided to allow a user the opportunity to identify and correct mis-transcribed words.

Figure 3:
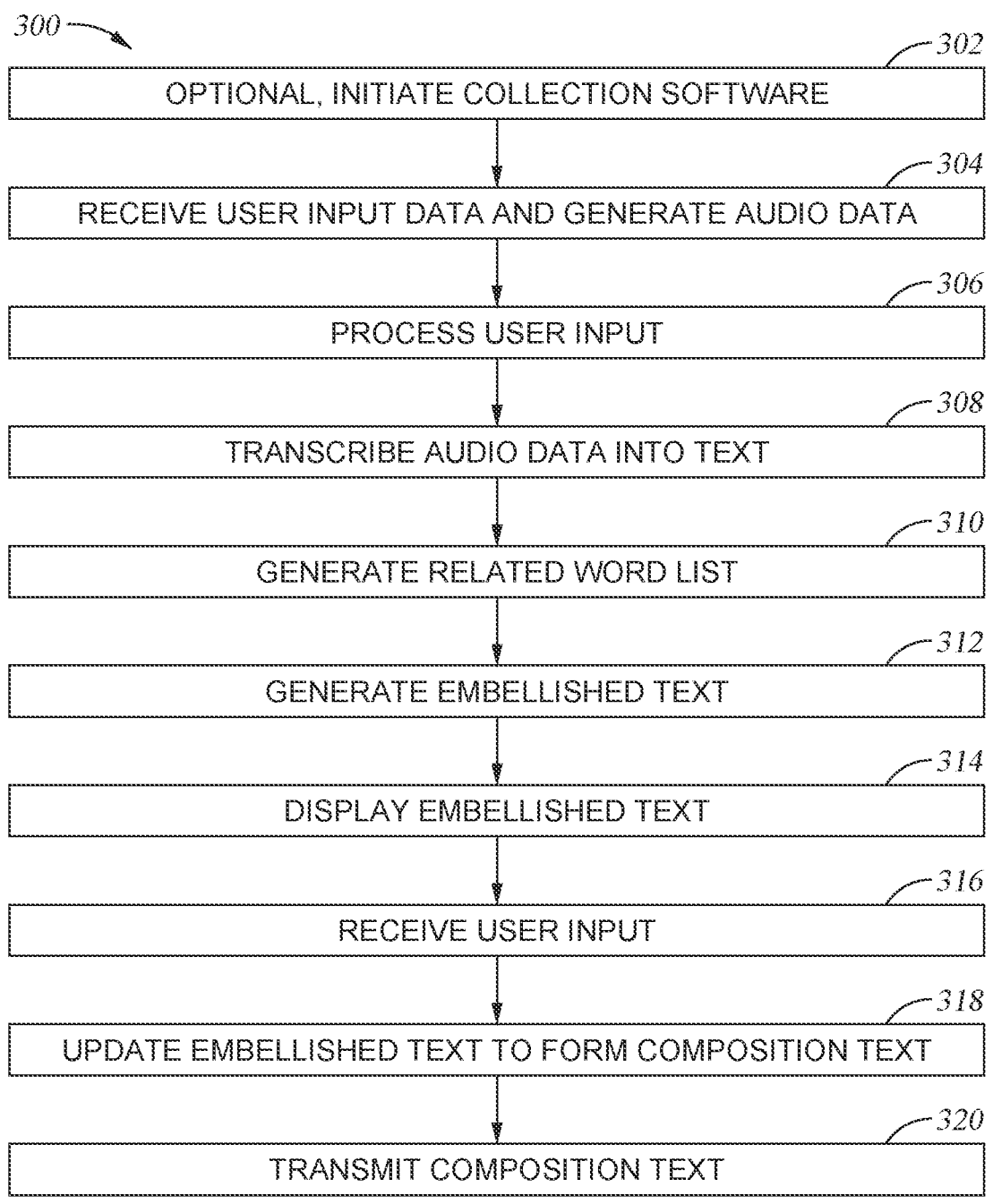
FIG. 3 illustrates a method of transcribing audible information to text and identifying potential incorrect converted words according to certain embodiments.
Figure 4A:
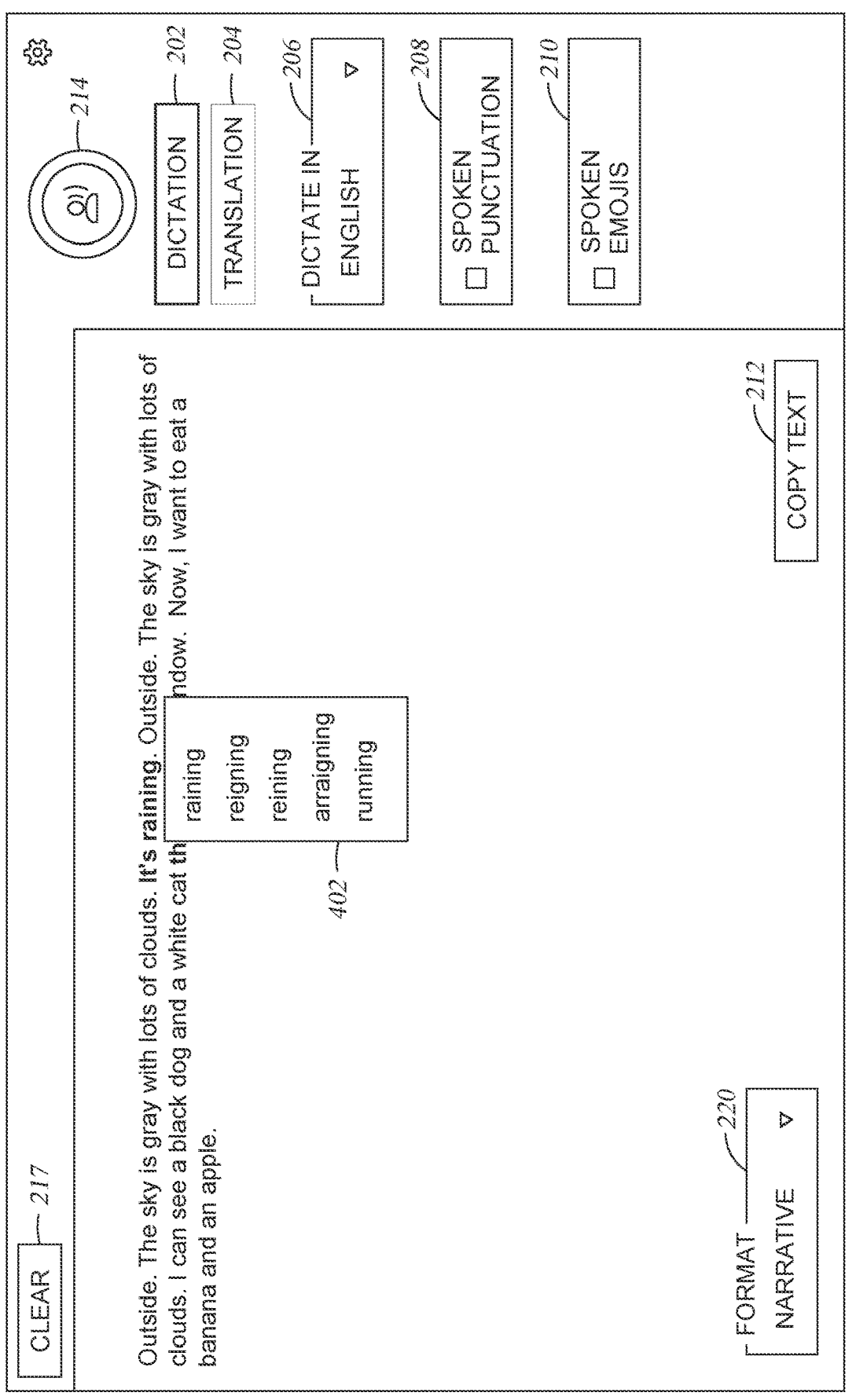
FIGS. 4A-4B illustrate a GUI displaying embellished text transcribed from audible information including embellished words that may have been incorrectly transcribed.
Figure 4B:
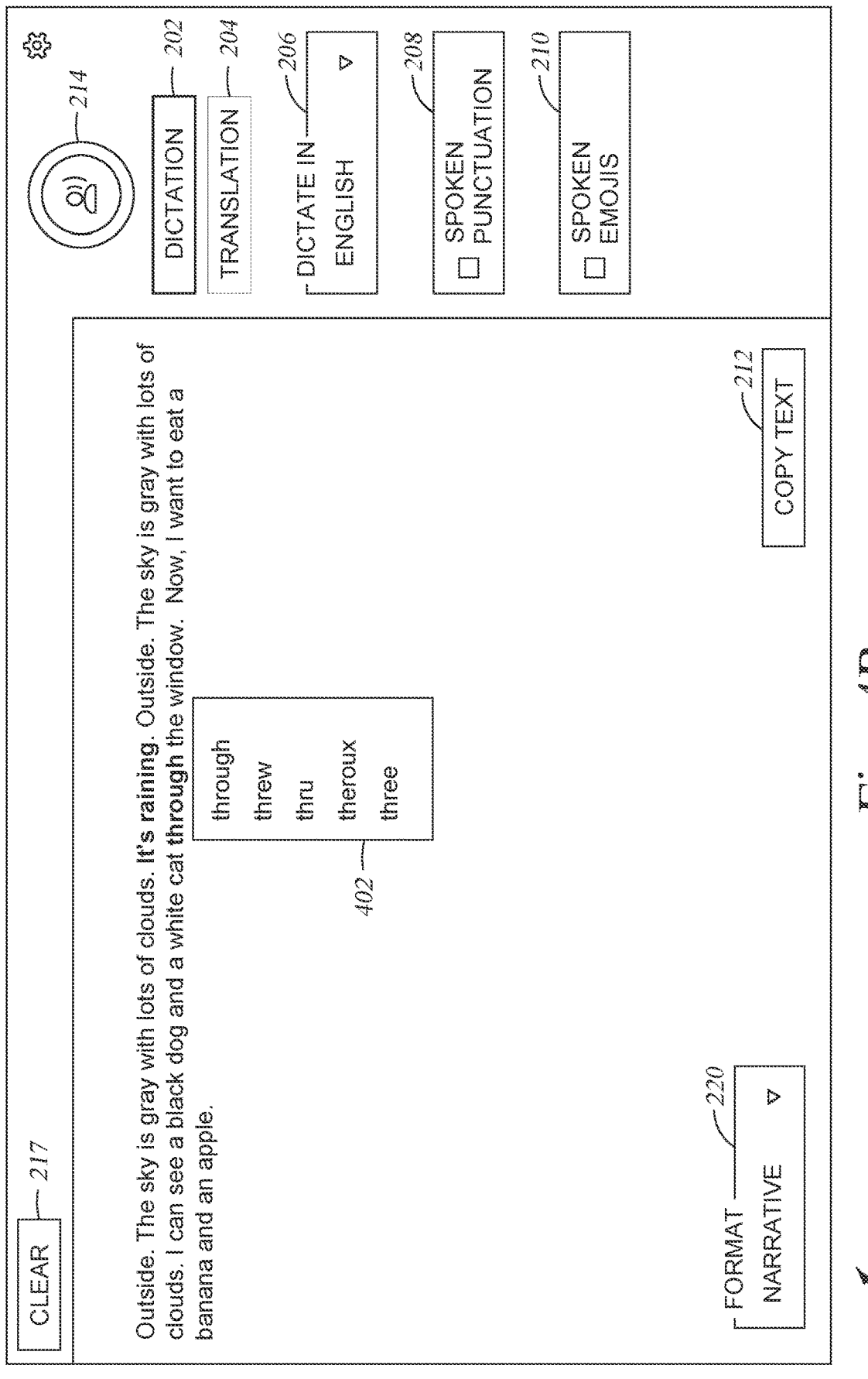

FIG. 3 illustrates a method 300 of transcribing audible information to alphanumeric information (e.g., text) and identifying potentially incorrectly transcribed words according to certain embodiments. FIGS. 4A-4B illustrate a GUI 200 displaying embellished text transcribed from audible information including embellished words that may have been incorrectly transcribed.

At activity 302, a collection software portion of the program 123 is initiated. In certain embodiments, the collection software is initiated by a user input 60 provided from the user 51. The collection software portion of the program 123 may be initiated by the user 51 by the user pressing the button 112 on the user input device 111 (i.e., user input 60). The collection software of the program 123 may also be initiated by the user 51 selecting the software via a prompt on the display 129, such as a shortcut icon, or the like. In certain embodiments, the collection software may be automatically initiated at the start-up of the computer 120 and run in the background. In other embodiments, the program 123 may be initiated by the user 51 opening another application such as a video conferencing application, a single user or multiuser video game, or the like.

The user 51 may then indicate, using the prompts shown on the GUI 200, what mode the collection software of the program 123 is operating in. At this activity, the user 51 may choose whether the collection software is configured to operate in dictation mode or translate mode. The user 51 may select dictation mode by selecting the dictation prompt 202, or translation mode by selecting the translation prompt 204. As illustrated in FIGS. 4A-4B, the user 51 selected the dictation prompt 202, placing the collection software in dictation mode. In dictation mode, the user 51 may indicate the dictation language from a drop-down menu in the dictate to prompt 206 and indicate whether punctuation and/or emojis are going to be dictated by checking/unchecking the boxes in the spoken punctuation prompt 208 and spoken emojis prompt 210, respectively.

At activity 304, after indicating the mode and the associated options on the GUI 200, the user 51 may select the record prompt 214 after which the computer 120 may receive the user input data 70. The user input data 70 may include the audible information received by the audio assembly 115 that is provided from or by the user 51. In certain embodiments, the user input data 70 may include audible information, which includes an audio signal captured by the audio assembly 115 and video data of the user captured by video sensor 117 as the user 51 is speaking into the audio assembly 115. When the user 51 is finished dictating, the user 51 may re-select the record prompt 214 to cease recording.

At activity 306, the program 123 may process the user input data 70 captured by the computer 120. The program 123 may cause the audio signal to be converted into a digital audio signal. The program 123 may cause audio data to be generated from the audible information received user input data 70. The audio data may include the audible information and metadata derived from the audible information included in the captured audio signal and/or video data captured during dictation by the user 51. The audio data and the metadata may be streamed to one or more other users, including a moderator. The metadata is generated by the program 123 and is based on an analysis of the audible information by the program 123. Metadata may include audible characteristic information that includes data about a word or group of words that included changes in the volume, intonations, inflections and/or tone when provided by the user 51 in the received the user input data 70, and/or video data that is collected from a user 51, which can include changes in the facial expression, and body language of the user 51 corresponding to each word as each word was provided in the user input data 70. In some embodiments, the video data can be collected by portions of the program 123, or other software application, that is configured to analyze video signals received from the video sensor 117 (e.g., video camera). The analysis of the received video signals can determine a difference or change in the way the user is delivering the audible information, such as a facial expression, movement of the user (e.g., hand gestures, head movement, etc.), change in direction the user is facing, or other similar body language information. The metadata can also include other information relating to the user, computer 120, and/or transcription information provided by the user due to the user's interaction with the GUI 200 (e.g., dictation language, translation language, etc.). The program 123 may cause the audio data to be stored into memory 122.

In some embodiments, the program 123 may generate histogram(s) based on the generated audio data and metadata. For example, if the program 123 is capturing audio data from multiple users, the program 123 may generate histograms indicating how many times specific word(s) were said by each user. The histogram information can be used by the program 123 to make decisions regarding the processes of embellishing text. In another example, the program 123 may generate histograms based on how the metadata relating to a user changed when the user said a specific word or phrase. In one example, a histogram may track the cadence or the volume of a user's voice when saying the specific word or phrase, so that a change in an attribute of the generated audio data and metadata can used to adjust the embellished text accordingly. For example, the data in the histogram can determine an increased use of a word or phrase noting that a user has become angry and thus the subsequently generated embellished text is adjusted accordingly (e.g., increase font size or color of text) due to the change in the user's way of communicating.

In other example, the histograms or other types of post-processing may be used to keep track of an individual user's metadata. For example, while recording, the program 123 may track multiple types of metadata and generate individual histograms for each type of metadata. In certain embodiments, the program 123 may evaluate the histograms to generate baseline metadata for individual user and learn to embellish text based on the baseline data. For example, if a user speaks at a higher volume than average, the program 123 may detect that and learn not to embellish text based on the above average speaking volume of the user.

At activity 308, the program 123 causes the audio data to be transcribed into alphanumeric information, such as into text. In some embodiments, the program 123 is configured to covert the audio data into text. However, in some alternate embodiments, the program 123 causes the audio data to be transferred to the first device 131 located in the cloud 130 via the communication link 135 where the audio data is transcribed into text by a first server program. The first server program of the first device 131 may convert the received audio data into text data by transcribing the audio data into text, and save the text as first text data. The first text data may include alphanumeric information including the audio transcribed data that has been transcribed in the indicated language and the quality (confidence) score for each of the words in the transcription. The quality score may be expressed as a percentage indicating how confident the first device 131 transcribed each word correctly. The quality score is thus used to indicate a confidence level that the first device 131 correctly transcribed each word based on the audible input received from a user. The confidence level, for example, can vary due to clarity of the audible information provided by a user 51, the user's pronunciation, and/or variability in the confidence that the program has in the selection a word due to homophones. The first device 131 may then provide the first text data back to the program 123 running on the computer 120.

During activity 308, the program 123 compares the quality score provided for each word within the text data with a threshold quality score that is stored in memory to determine which of the words need to include an embellished appearance. In one embodiment, the a desired threshold quality score may be selected based on user input, a stored user setting or on a specific context defined by rules used by the program 123. In one example the quality score threshold may range between 70%-97%. In another example, a quality threshold score of 95% may be used, meaning that each word having a quality score below 95% might have a higher probability that the word provided in the text data was incorrectly transcribed. Although a quality score threshold range of 70%-95% is described herein, any other desired threshold quality score may be used. A desired quality score threshold value may be set by type of activity (e.g., dictation mode, translation mode, etc.) that is being performed by the program 123. As will be described in more detail below, the program 123 will cause the eventual representation of the word within the text data that is displayed to a user to have an embellished appearance for each word below the threshold quality score and provide the user a related words list. A word that has an embellished appearance when displayed is often referred to herein as being embellished. Advantageously, the embellished word can be used by the program 123 to signify that a transcribed word has a higher probability that it is incorrectly transcribed versus other words or alphanumeric information within the text data. The program 123 executed may then embellish the alphanumeric information (e.g., words within text) found in the first text data that have a quality score below a threshold quality score that is stored in memory 122, which is described in more detail below.

At activity 310, the second device 132 is used to generate a related word list and transmit the word list in a second text data to the computer 120. During activity 310, the second device 132 will receive the first text data from the computer 120. In certain embodiments, the program 123 causes the computer 120 to transmit only the words that are below the quality score threshold to the second device 132. However, in some cases, the program 123 causes the computer 120 to transmit the complete first text data to the second device 132. In some embodiments, the metadata is also transmitted to the second device 132 in an effort to help the second device 132 select the related word list. In either case, the second device 132 analyzes each word it receives and determines if there are any words that have the same/similar pronunciations to each of the words in the first text data, which are often referred to as homophones. Homophones are words that have the same/similar pronunciations (sound same) but have different meanings, origins, or spellings. Examples of homophones include, but are not limited to, sea and see, or two, to and too, or new and knew. Words that have homophones have an increased chance of being mistakenly transcribed. Each word in the related words list includes a similarity score indicating how close the pronunciation of each word in the related word list is to the corresponding word. The list(s) of related words generated by the second device 132 are then transferred from the second device 132 to the computer 120.

Alternatively, in some embodiments of activity 310, the program 123 is further configured to generate the list of related words on its own, and without the use of the second server program and the second device 132. The list of related words may be stored and retrieved from memory 122 by the program 123. In this this case, it is not necessary for the first text data to be sent from the computer 120 to the second device 132, the second device to analyze and generate the list of related words, or the second device to send the list of related words to computer 120.

At activity 312, the program 123 decides, based on at least the comparison between quality score and quality score threshold, which text in the first text data should be embellished. In certain embodiments, the program 123 determines which text is to be embellished by comparing the quality score of each word in the first text data to the threshold quality score. If the quality score of a word in the text data is below the threshold quality score, the program 123 will cause an embellished word to be displayed on the display 129. The program 123 may embellish the font(s) of the word by bolding, italicizing, underlining, highlighting, blurring, and combinations thereof. The program 123 will assign the list(s) of related words generated by the second device 132, or generated by the program 123 directly, to each embellished word.

In some embodiments, the words that are to be embellished are selected at least partially based on the quality score information and the metadata that was collected during activity 306. The information contained within the metadata is used to provide context on which words should be embellished. Stated differently, based on the information contained within the metadata, words that are above the quality level threshold may be embellished. Similarly, words that are below the quality threshold level may not be embellished based on the information contained in the metadata. The contextual information found in the metadata may include, for example, a list of keywords defining the context domain, emotional states derived by a sentimental analysis (e.g., analysis that looks for a known word or phrase that has a common special meaning), the tone of the speech provided from the user (e.g., louder than normal speech denoting anger), a facial expression of the user (e.g., angry or happy facial expression), background noise, body language of the user, body language of the audience or combinations thereof. In certain embodiments, as described above, using post-processing techniques, the program 123 may determine a baseline of each type of metadata for each user, and embellish text based on fluctuations from the baseline. For example, if a user speaks at volume louder (or softer) than the average person, the program 123 will detect this is the normal speech pattern for the user and not embellish text as if said user is angry.

The baseline metadata may be stored in a database. The database may be accessible by the program 123 locally or externally (i.e., stored in the cloud). In one example, the database is stored in the memory 122 of the computer 120. In another example, resides in a streaming application accessed by multiple users. For example, during online gaming, the database may reside in the game being played. The baseline metadata may be populated by the user, may be pre-determined, or may be added from based on a list of average metadata external to the database such as a list of baseline metadata posted on the internet by an organization. For example, the database may initially be populated with information relating to a baseline voice volume and cadence level found on the internet, information relating to a baseline voice volume and cadence level that is pre-programmed, or information relating to a baseline voice volume and cadence level set by a user (among other types of metadata). In some embodiments, the baseline metadata stored in a database can be continually updated by use of artificial intelligence and machine learning techniques. In one example, the database used to store information about offensive language and the baseline metadata are a same database. In another example, the database used to store information about offensive language and the baseline metadata are different databases.

In some embodiments of activity 312, the program 123 forms a curated list of words that is configured to highlight one or more words found in the list of related words, which were formed during activity 310, that are likely to be used in place of the words that have received a low quality score and have been selected to be embellished. The act of highlighting the one or more words can include altering the words or list of words that are ultimately presented to a user when an embellished word is selected during subsequent activity 316, which is discussed below. The process or outcome of altering the words can include: forming an ordered list of words such that the words that are likely to be used in place of the words that have received a low quality score are presented near the top of the list; reducing the number of words that are to be provided to a user during activity 316 to only the most likely words (e.g., top three likely words); or altering a characteristic of one or more words in the list of related words (e.g., the most likely words). In one example, in the process of forming the curated list, the program 123 may organize the list(s) of related words. The program 123 may analyze and then order the list(s) of related words provided in the second text data so that they are listed in order of their similarity scores. Stated differently, the program 123 will re-order the list(s) so the words having the closest pronunciations to the transcribed words are listed in descending order. In some embodiments, the curated list may include a restricted list of related words, which is often referred to herein as creating a presentation list of words. In another example, the program 123 may include a presentation list of related words based on a threshold similarity score. For example the presentation list(s) of words may be restricted to words having a similarity score above 90, and all words below will be removed to the list. On the other hand, the program 123 may form a presentation list of words that is limited to a specific number of words.

In some cases, during activity 312, the analysis and selection of the order of the words in the curated list and/or the creation of the presentation list is completed by use of a library of words or phrases that are stored in memory. The library of words can be used by the program 123 to form the curated list of words that includes a listing and/or ranking of commonly used words received from prior interactions with a user, or words commonly used in the language selected by the user. In one example, a formed curated list of words is created after it is determined that an embellished term is related to the top two or three words typically received from a user. The process of determining that the embellished term is related to the top two or three words can include comparing the embellished term with a previously created and stored library of words.

In some embodiments of activity 312, the program 123 may order and/or restrict the list(s) of related words based on contextual information provided by or within the metadata. In some embodiments, in forming the curated list of words the program 123 may filter the list(s) of related words based on the context of a sentence or paragraph using a natural language processing (NLP), such as large language model (LLM). Stated differently, the curated list(s) of related words may be restricted to words that make grammatical sense based on the context of a sentence or paragraph in the first text data. In some embodiments, the organization of the list of words is at least partially based on the quality score information and the metadata that was collected during activity 306.

At activity, 314 the program 123 may display the embellished text on the display 129 in the GUI 200, as shown in FIGS. 2 and 4A. In one example, as illustrated in FIG. 4A, the words below the confidence threshold may be embellished by bolding.

At activity 316, the computer 120 receives a second user input. The second user input may be the user 51 correcting the embellished word(s) and or non-embellished words by selecting a word from a list so the words found in the second text data. The user 51 may correct an embellished word, by selecting an embellished word that was incorrectly transcribed using the user input device 111 (or by touch). Selecting the embellished word may cause a drop down menu 402 (e.g., FIGS. 4A-4B) comprising the list of related words assigned to the embellished word. This allows the user 51 to select the correct word from the list of related words. Also the user 51 may correct text that is incorrect but had a quality score above the threshold or amend the text for any reason using a keyboard or other user input device. In some embodiments, the drop down menu 402 provided to the user 51 only includes the curated list of words formed during activity 312.

At activity 318, after correcting the incorrect text, the text within the first text data may be updated from embellished text to a final approved set of text, which is referred to herein as "composition text." In certain embodiments, the user 51 may select the copy text prompt 212, indicating to the program 123 that the user 51 has no further corrections. The program 123 may remove any of the embellishments from the text, to form the composition text.

At activity 320, the composition text may be provided into a software application such as a word processing application, a web based application, such as an email, a slideshow presentation application, a chat application, or the like.

Embellishing Words and/or Phrases Associated with an Emoji Example

To improve the accuracy of generated alphanumeric data, the program 123 may embellish words that are associated with an emoji to improve the communicative and expressive properties of the generated alphanumeric data provided between users. As noted above, the use of emojis can also be useful in reducing the amount of information that needs to be transferred in a digital communication.

Figure 5:
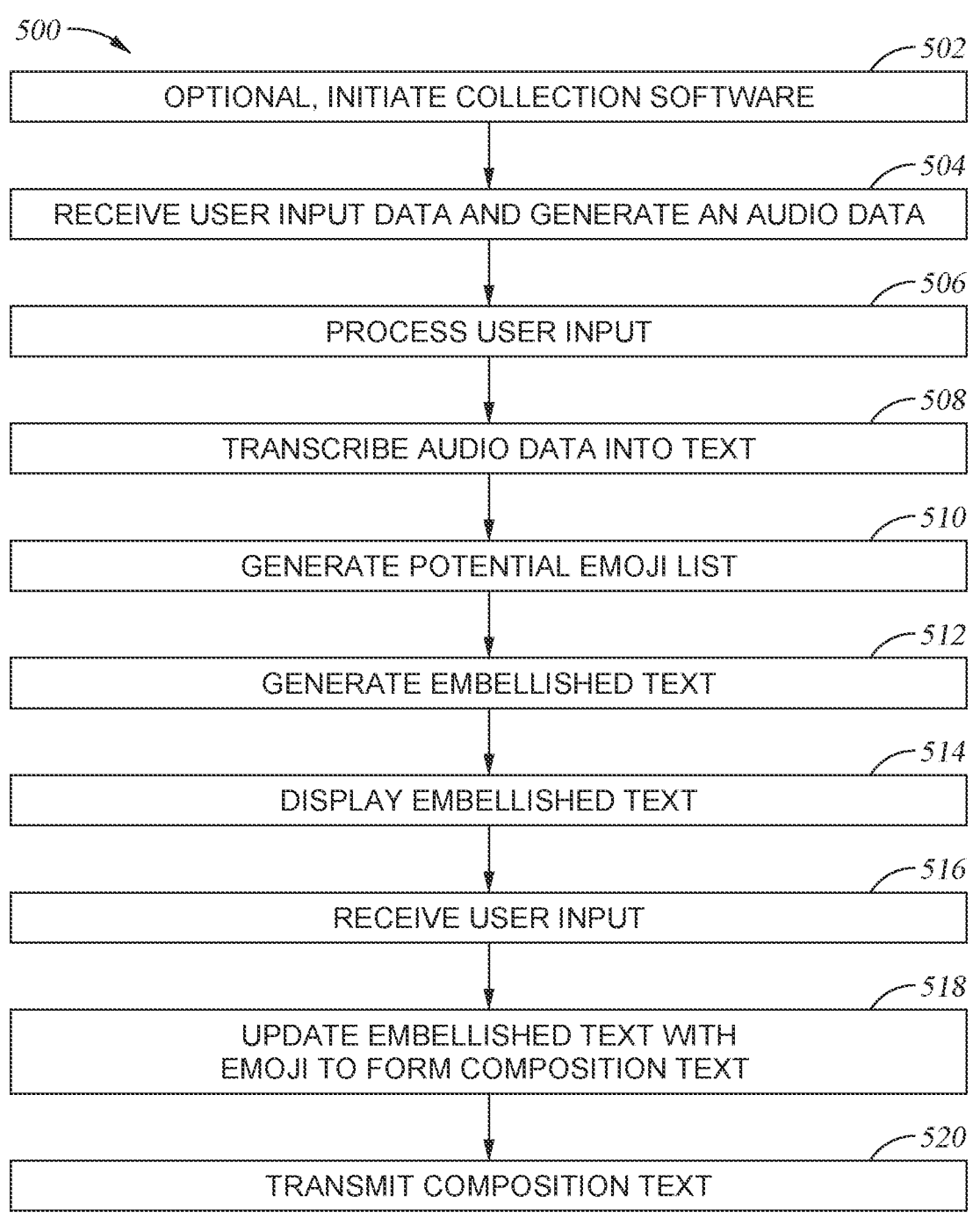
FIG. 5 illustrates a method of transcribing audible information to text and identifying words or phrases that are associated with an emoji according to certain embodiments.
Figure 6A:
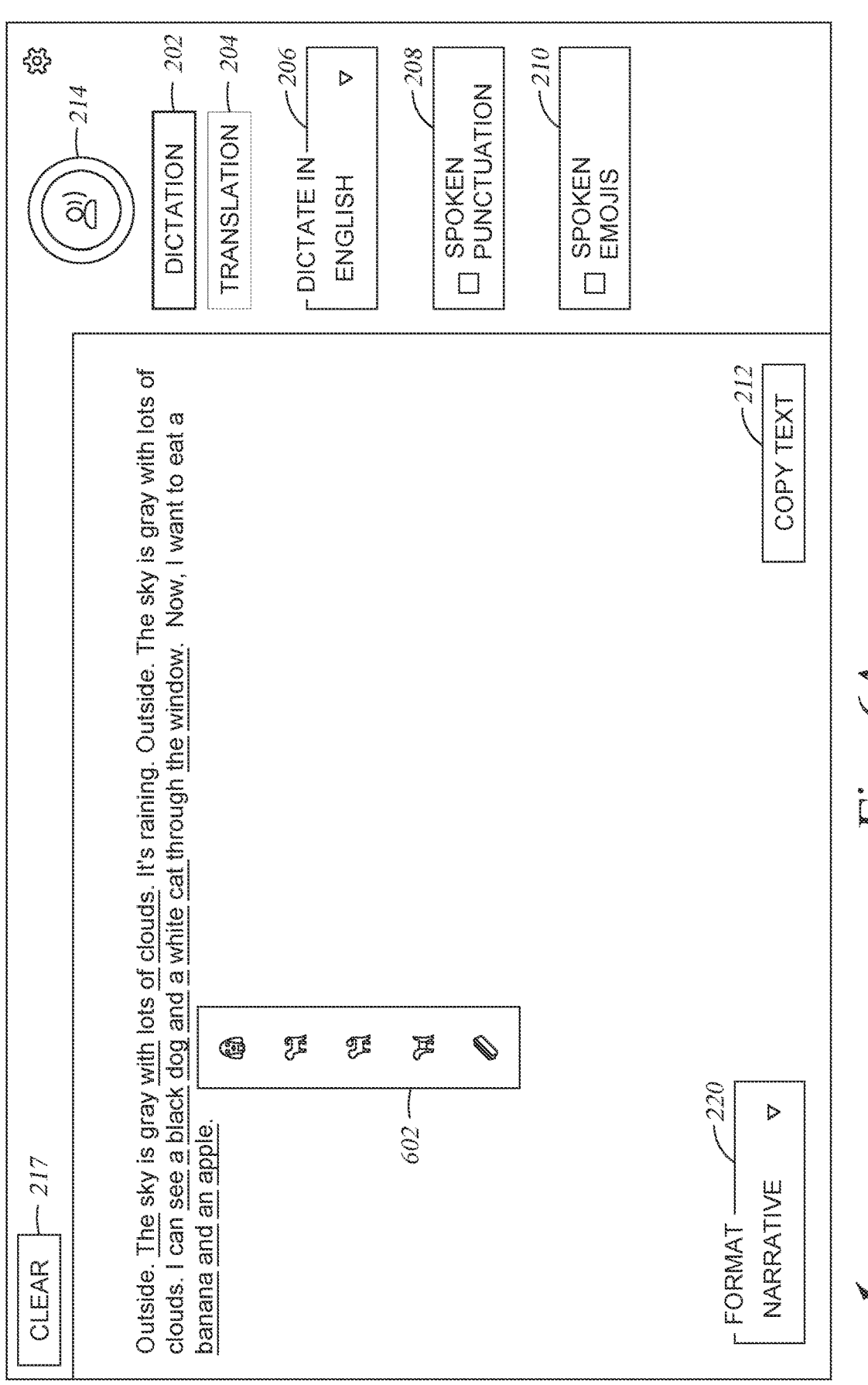

FIG. 5 illustrates a method 500 of transcribing audio to text and identifying words or phrases that are associated with an emoji according to certain embodiments. FIGS. 6A-6B illustrate a GUI 200 displaying embellished text transcribed from audible information including embellished words that may be associated with an emoji At activity 502, the collection software portion of program 123 is initiated. The collection software of the program 123 may be initiated in the same manner described in activity 302 above. As illustrated in FIGS. 6A-6B, the user 51 selected the dictation prompt 202, placing the collection software of program 123 in dictation mode. In dictation mode, the user 51 may indicate the dictation language from a drop-down menu in the dictate to prompt, 206 and indicate whether punctuation and/or emojis are going to be dictated be checking the boxes in the spoken punctuation prompt 208 and spoken emojis prompt 210, respectively. After indicating the mode and the other available options, the user 51 may select the record prompt 214.

At activity 504, computer 120 may receive the user input data 70. The program 123 may receive the user input data 70 in the same manner described in activity 304 above. When the user 51 is finished dictating the user 51 may re-select the record prompt 214 to cease recording.

At activity 506, the program 123 may process the user input data 70 captured by the computer 120. The program 123 may cause audio data to be generated from the audible information received user input data 70 in the same manner described in activity 306.

At activity 508, the program 123 causes the audio data to be transcribed into alphanumeric information, such as into text. During activity 508, the program 123 causes the transcription of the audio data in one or more of the different manners described in activity 308. In one example, the program 123 causes the first server program running on the first server to transcribe the audio data and generate a quality score for one or more words within the generated text data.

At activity 510, the program 123 is used to generate a potential emoji list. In some embodiments, the program 123 analyzes each word of the first text data and determines if there are any emojis that may be associated with word(s) or phrase(s) in the first text data. In certain embodiments, the program 123 may at least partially determine which words or phrases to associate with an emoji based on a list of rules. The list of rules be personalized by the user 51 by editing a dictionary of personal word-emoji associations. In some embodiments, the emojis that are selected as being potential emojis are at least partially based on the metadata that was collected during activity 506. In certain embodiments, the program 123 may organize the list(s) of emojis based on the history of emoji use of the user 51 and the stored metadata generated during activity 506. In certain embodiments, the emojis included in the emoji list(s) may be ordered and limited based on how the user delivered the associated alphanumeric information (e.g., word). For example, the program 123 may determine which emojis to recommend based on the volume, tone, aggression facial expression, body language of the user, and combinations thereof of the user 51 as the user 51 said the word or phrase. Alternatively, in some embodiments, during activity 510, the second device may receive the first text data from the computer 120, and generate the list(s) of potential emojis. In certain embodiments, the metadata captured by the video sensor 117 is used to determine which emojis to recommend based on the user's 51 facial expression, body language, movements, hand gestures, or combinations thereof. For example, if the user 51 is dictating an email, but the information contained in the metadata showed the user 51 demonstrated sarcastic (e.g., funny or joking) facial expressions, movements, and hand gestures, the recommended emojis may include a smiling face, a laughing face, winking face, and combinations thereof based on the information received in the metadata. Alternatively or additionally, the memory 122 may maintain a history of the user's 51 emoji use and limit and/or re-order the list(s) based on the user's 51 emoji history. The program 123 may track and save a usage counter that tracks how many times each supported emoji is selected by the user 51. The program 123 may also store a time stamp along with each usage and/or make note of the last time each emoji was selected by the user 51. The history of the user's emoji use along with the metadata may be used to filter and order each list of emojis in the list that is supplied to the user. In certain embodiments, as described above, using post-processing techniques the program 123 may determine a baseline of each type of metadata for each user, and recommend emojis based on fluctuations from the determined baseline.

In certain embodiments, the program may generate the list(s) of potential emojis based on context. For example, for idioms such as its "raining like cats and dogs" the emoji list would include emojis related to thunder storm instead of literal cats and dogs.

At activity 512, the program 123 generates embellished text. In certain embodiments, the program 123 generates embellished text by indicating words and/or phrases associated with an emoji. The program 123 may embellish the words and/or phrases in the same manner. For example, the program 123 may embellish the font(s) of the words and/or phrases by bolding, italicizing, underlining, coloring the font(s), highlighting, and combinations thereof. As illustrated in FIG. 6A, the words associated with an emoji may be underlined. The user 51 may select a preferred emoji from a drop down menu 602 by selecting an embellished word on the GUI 200.

Alternatively, the program 123 may embellish the words and phrases associated with an emoji differently. The words may be embellished in the same manner described above, while the phrases may be embellished by inserting a symbol, such as a dot, at the end of the phrase. For example in FIG. 6B, the words associated with an emoji are underlined, and the phrase associated with an emoji is embellished by a dot.

At activity, 514 the program 123 may cause the embellished text to be displayed in the GUI 200 on the display 129 of the computer 120.

At activity 516, the computer 120 receives a second user input. The second user input may be the user 51 selecting an emoji from an emoji list, such as the menu 602 illustrated in FIG. 6A. The user 51 may select an emoji by selecting an embellished word or phrase associated with an emoji using the user input device 111 (or by touch). Selecting the word or phrase may cause a drop down menu 602 (FIG. 6A)

allowing the user 51 to select the desired emoji. The emoji selected by the user 51 may either replace the embellished word or phrase, or may be inserted after the embellished word or phrase depending of the settings stored in memory 122 defined by the user 51.

At activity 518, after selecting an emoji, the text first text data may be updated from embellished text to composition text, as discussed above. In certain embodiments, the user 51 may select the copy text prompt 212, indicating to the program 123 that the user 51 has completed the second user input. The program 123 may remove any of the embellishments from the text, forming the composition text.

At activity 520, the composition text may be provided into a software application such as a word processing application, a web based application such as an email, a slideshow presentation application, a chat application or the like.

Embellished Words and Emojis Example

To improve the accuracy of generated alphanumeric data, the program 123 may embellish potentially mis-transcribed words, and words and/or phrases that are associated with an emoji to improve the communicative and expressive properties of the generated alphanumeric data provided between users.

Figure 7:
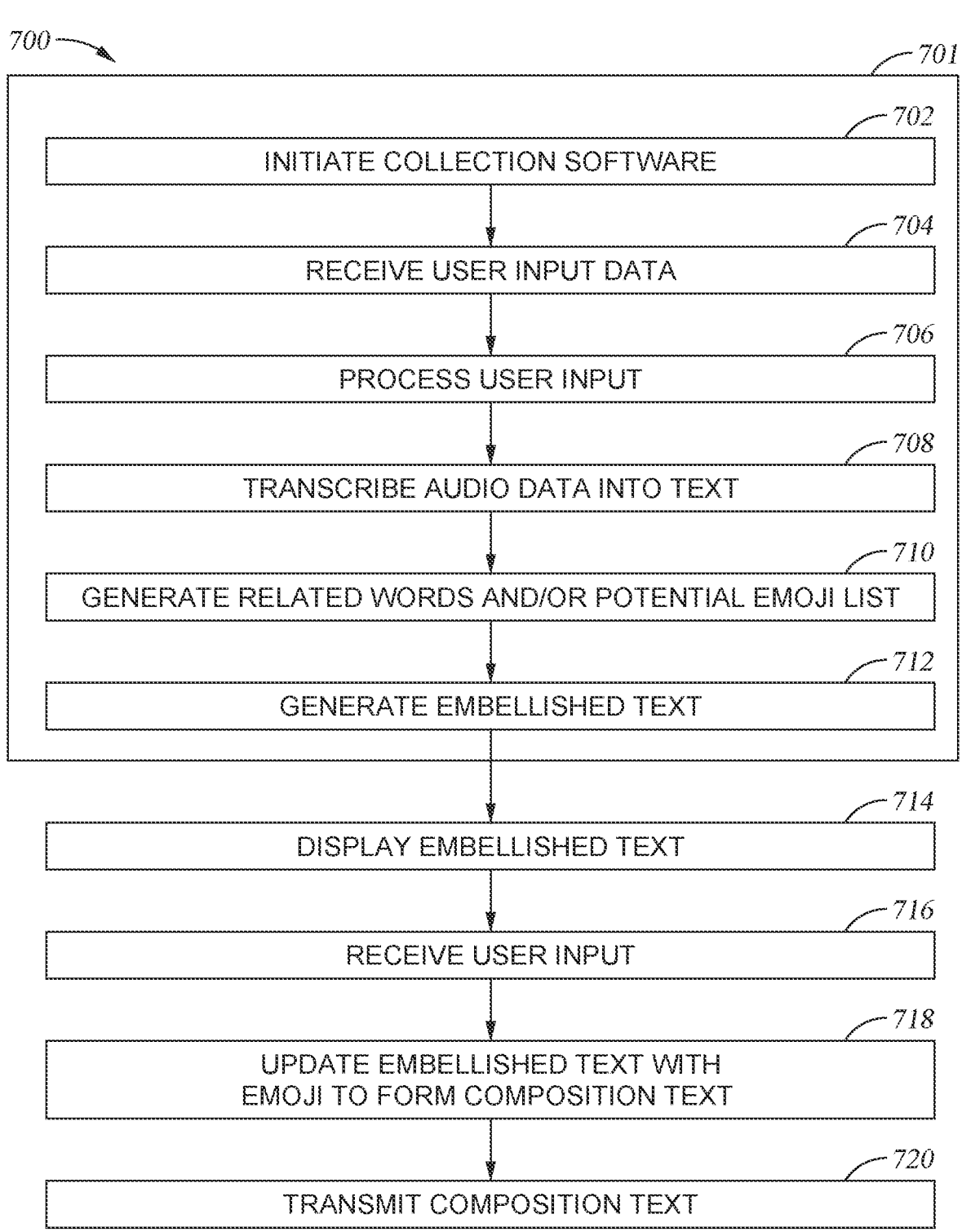
FIG. 7 illustrates a method of transcribing audible information to text, identifying potential incorrectly converted words, and identifying emojis associated with the transcribed words according to certain embodiments.
Figure 8:
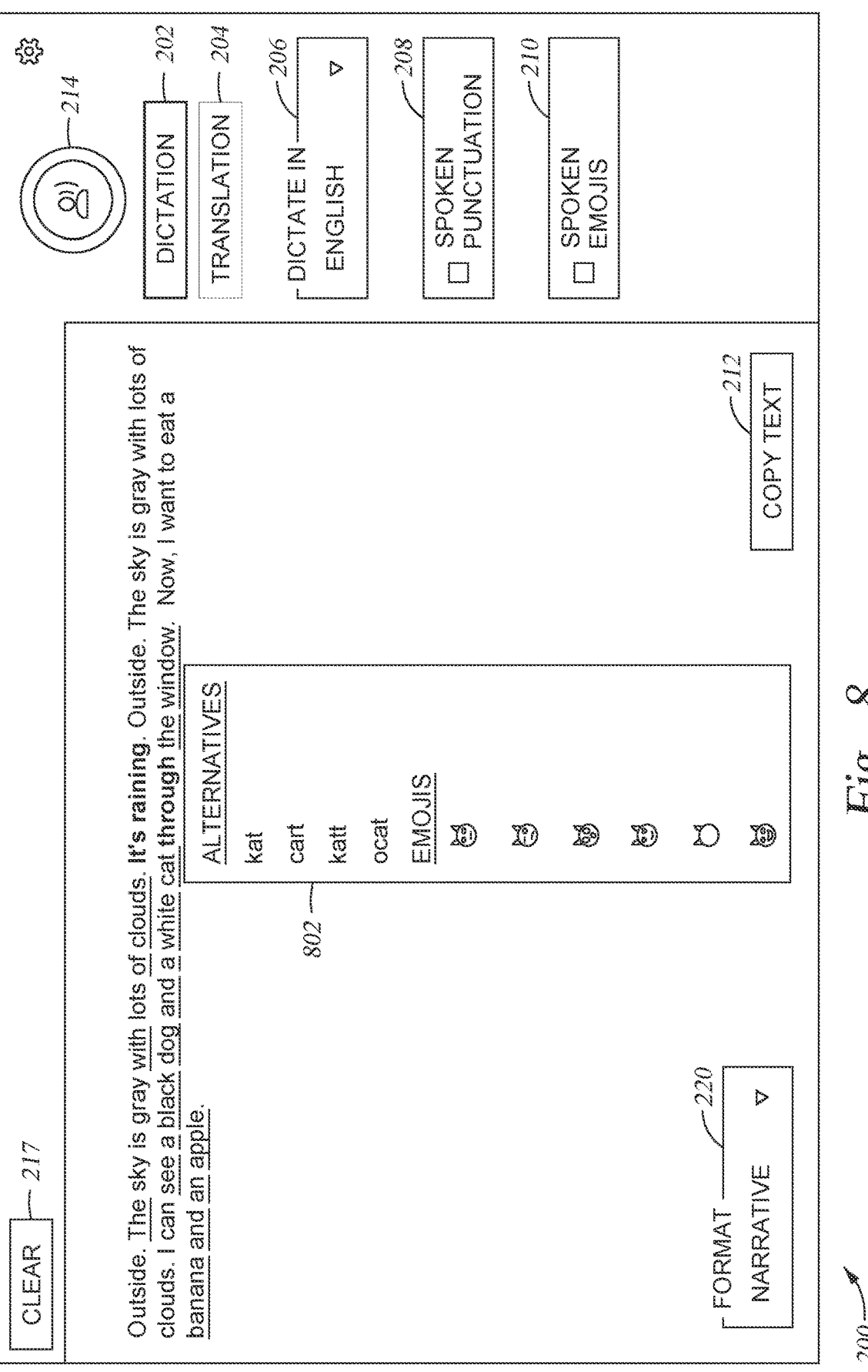
FIG. 8 illustrates a GUI displaying embellished text transcribed from audible information including embellished words that may have been incorrectly transcribed, and embellished words that may be associated with an emoji.

FIG. 7 illustrates a method of transcribing audible information to alphanumeric information (e.g., text), identifying potential incorrectly transcribed words, and identifying emojis associated with the transcribed words. FIG. 8 illustrates a GUI 200 displaying embellished text transcribed from audible information including embellished words that may have been incorrectly transcribed, and embellished words that may be associated with an emoji.

At activity 701 a text embellishment process is performed. The text embellishment process will generally include activities 702-712, which are discussed further below. The text embellishment process will include a combination of one or more of the activities found in the methods described in FIGS. 3 and 5.

At activity 702, collection software of program 123 is initiated. The collection software may be initiated in the same manner as described in activity 302 above. As illustrated in FIG. 8, in one example, the user has selected the dictation prompt 202, placing the collection software in dictation mode.

At activity 704, the computer 120 receives the user input data 70. The computer 120 may receive the user input data and perform the actions in the same manner as described in activity 304. When the user 51 is finished dictating, the user 51 may re-select the record prompt 214 to cease recording.

At activity 706, the program 123 may process the user input data 70 captured by the computer 120. The program 123 may process the user input data in the same manner described in activity 306.

At activity 708, the audio data may be transcribed into text. The program 123 may transcribe the audio data in the same manner described in activity 308.

At activity 710, the program 123, or the second device 132 may generate a potential emoji list and/or a list of related words. Activity 710 is a combination of activities 310 and 510, in which the program 123, and/or the second device 132 is used to analyze each word within the first text data to determine if there are any words that have the same/similar pronunciations to each of the words in the first text data and if there any emojis that may be associated with word(s) or phrase(s) in the first text data, as described in more detail above. For example, the program 123 may generate the list(s) of related words and the list(s) of potential emojis. The program may 123 may generate the list(s) of related words and the second device 132 may generate the list(s) of potential emojis. The program 123 may generate the list(s) of potential emojis and the second device 132 may generate the list(s) of related words. The second device 132 may generate both the list(s) of related words and the list(s) of potential emojis. The list(s) of related words and emoji list(s) may be generated at least partially based on the metadata that was collected during activity 704.

At activity 712, the program 123 generates embellished text. In certain embodiments, the program 123 may embellish both words that are below the quality score threshold and words or phrases that are associated with an emoji. The words below the quality score threshold, the words associated with an emoji, and the phrases associated with an emoji may each be embellished differently. As illustrated in FIG. 8, the words with low confidence levels may embellished by bolding, the words associated with an emoji are embellished by underlining, and the phrases associated with an emoji may be embellished with a symbol (e.g., "dot" illustrated in FIG. 6B). If a word is below the quality threshold and is associated with an emoji, it may be embellished in a different manner then both the words that are either below the quality score threshold or are associated with an emoji. The program 123 will assign and generate a combined list 802 combining the list of related words and the list of potential emojis, as illustrated in FIG. 8. For example, the words that are associated with a list of related words and an emoji may be represented in a third font color On the other hand, the words associated with both a list of related words and an emoji may be embellished the same manner as the words below the quality score threshold.

At activity, 714 the program 123 may cause the embellished text to be displayed in the GUI 200 on the display 129 of the computer 120.

At activity 716, the program 123 receives a second user input. The second user input may be the user selecting an emoji from an emoji list, a word from a related words list, or a word or an emoji from the combined list 802.

At activity 718, after receiving user input, the text may be updated from embellished text to composition text. In certain embodiments, the user 51 may select the copy text prompt 212, indicating to the program 123 that the user 51 has completed the second user input. The program 123 may remove any of the embellishments from the text, forming composition text.

At activity 720, the composition text may be provided into a software application such as a word processing application, a web based application such as an email, a slideshow presentation application, a chat application or the like.

First Translation Process Examples

To improve the accuracy of generated alphanumeric data, the program 123 may embellish potentially mis-transcribed words, and/or words and/or phrases that are associated with an emoji, and translate the embellished text into a different language to improve the communicative and expressive properties of the generated alphanumeric data provided between users that understand different languages.

Figure 9:
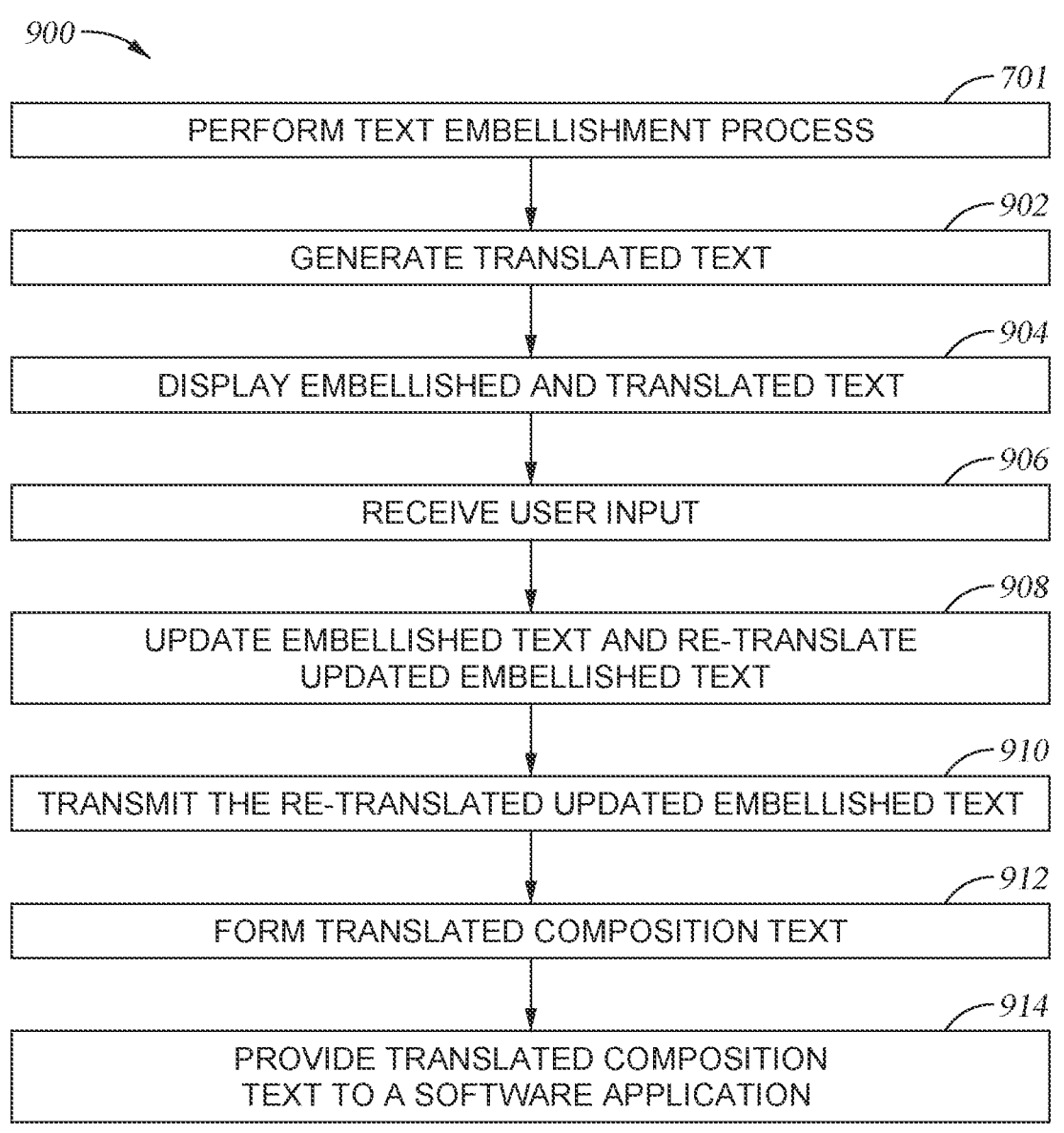
FIG. 9 illustrates a transcribing of converting audible information to text, identifying potential incorrectly converted words, and translating the text from a first language to a second language according to certain embodiments.
Figure 10:
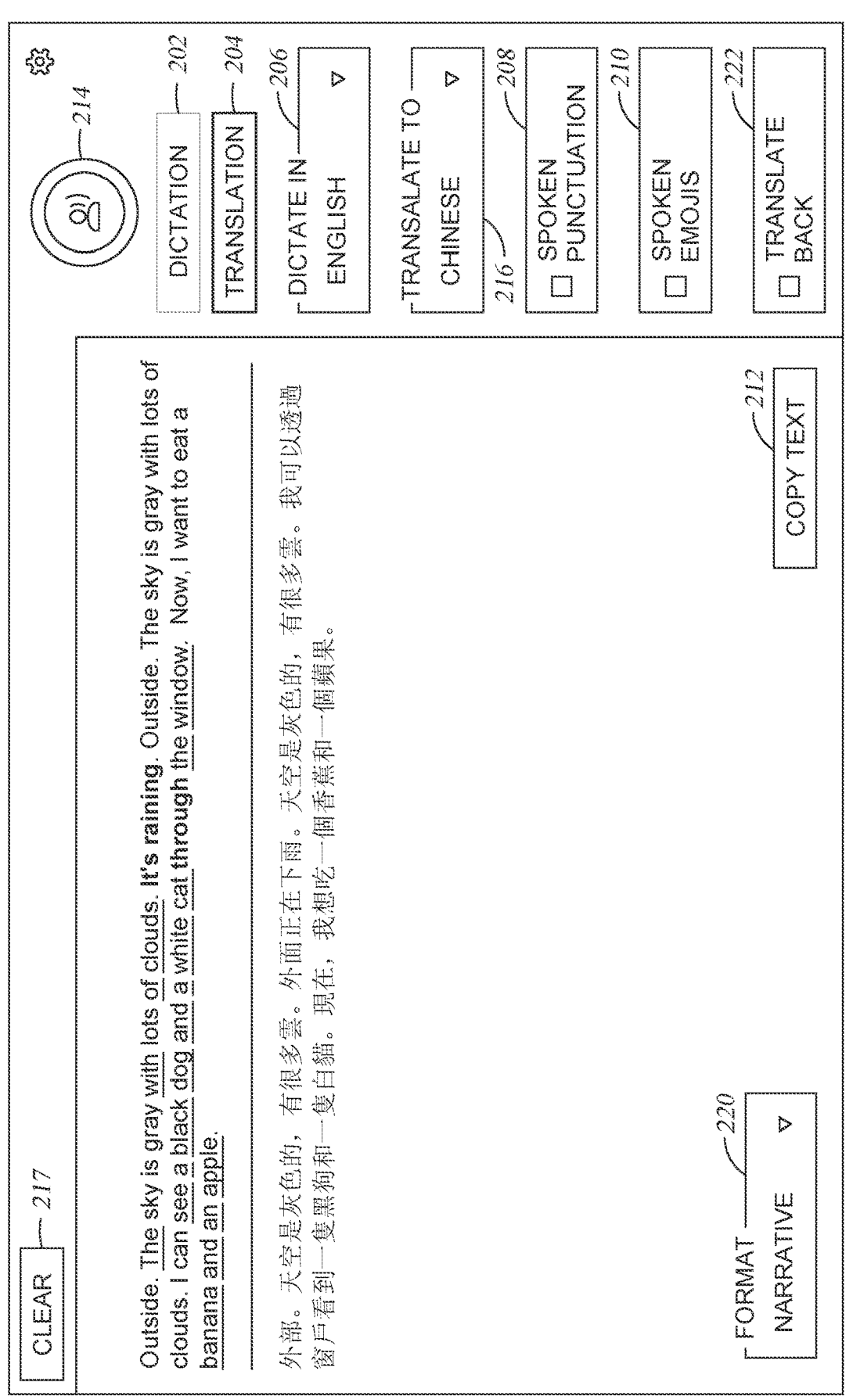
FIG. 10 illustrates a GUI displaying embellished text transcribed from audible information including embellished words that may have been incorrectly transcribed, and embellished words and a translation of the embellished text according to certain embodiments.

FIG. 9 illustrates a method of transcribing audible information into alphanumeric information (e.g., text), identifying potential incorrectly transcribed words, and translating the text from a first language to a second language according to certain embodiments. In one embodiment, the second language may be a spoken language such as Chinese. A spoken language would be a language conveyed by speech, writing, or gesture. In another embodiment, the second language may be a symbolic language including include a sequence of symbols understood by another person such as a sequence of emojis. FIG. 10 illustrates a GUI 200 displaying embellished text transcribed from audible information including embellished words that may have been incorrectly transcribed, and a translation of the embellished text according to certain embodiments.

At activity 701 the text embellishment process described above is performed. As illustrated in FIG. 10, the translation prompt 204 is selected, the dictation language (first language) is English and the language (second language) into which the received audible information is to be translated, in this example, is Chinese.

At activity 902, after performing activity 701, because the program 123 is in translation mode, the third server program running on the third device 133 is caused to generate translated text and save the translated text as a translation text data, which can be a third text data. During activity 902, in one example, the third device 133 translates the first text data from English to Chinese.

During activity 902, the program 123 may determine the third text data based on different meanings of words or phrases in different countries. For example, the word "football" in the United States versus the rest of the world has different meanings, even in countries with English as a national language. For example, in Spanish the translation of the word "football" is soccer in the United States. Based on the context of the alphanumeric data, the program 123 may determine what a user means when saying the word "football", and determine the third text data based on context. As another example, if the program 123 may use context of the alphanumeric data to determine whether it should use formal or informal language in the third text data. In yet another embodiment the program 123 may determine the third text data based on idioms. For example, if the user 51 is dictating in English and says "it is raining like cats and dogs," the program 123 will understand the user means that it is raining heavily and generate the third text data using words that would portray the same meaning in the "translate to" language.

At activity 904, the program 123 may cause the embellished text and the translated text to be displayed in the GUI 200 on the display 129 of the computer 120.

At activity 906, the computer 120 receives a second user input. The second user input may include the user 51 correcting the embellished word(s) and/or non-embellished words. The second user input may also include the user 51 selecting an emoji. Also the user 51 may correct text that is incorrect but had a quality score above the threshold or amend the text for any reason using a keyboard.

At activity 908, after the computer 120 receives the second user input, the program 123 may update the first text data with the updated text, and transmit the updated first text data to the third device 133. The third device 133 may translate the updated first text data and save it as a second version of the third text data and transmit the second version of the third text data back to the computer 120. The program 123 may overwrite the original third text data with the second version of the third text data, and display the first text data and the second version of the third text data. If the user 51 makes any further changes to the embellished text after it is retranslated, the program 123 will perform activity 908 until the user 51 indicates that no further corrections are required by selecting the copy text prompt 212.

At activity 910, after the user 51 indicates no further corrections are required the program 123 will transmit the displayed translated text to the computer's 120 clipboard for pasting into an application currently accessed by the user 51.

At activity 912, the computer 120 may additionally receive a third user input which causes the program 123 to form a translated composition text that includes the updated translation that is generated in the second language and was provided to the display 129.

At activity 914, the translated composition text may be provided into a software application such as a word processing application, a web based application such as an email, a slideshow presentation application, a chat application or the like.

Second Translation Process Examples

In an effort to improve the accuracy of a generated translation of alphanumeric data generated from audible information received from a user, a new and novel translation method 1100 can be performed. The method 1100 will include translating embellished text into a different language, and then translate the embellished text back into the original dictated language by use of a different translation process. Typically, when translating text from one language to another using a single device, the single device is not able to identify idioms or mononyms in different languages. Because the user 51 does not understand and/or cannot read in the translated language the user 51 is unable to detect these incorrectly translated idioms or mononyms. In method 1100, the alphanumeric information is translated to a different language in a first translation process and the translation is then translated back to the dictated (spoken) language by use of a different software program and/or separate algorithm within a translation program. This process allows for an independent translation of the originally translated text and thus will allow the user 51 to detect any errors in the translation and correct them, improving their ability to communication with others around the world.

Figure 11:
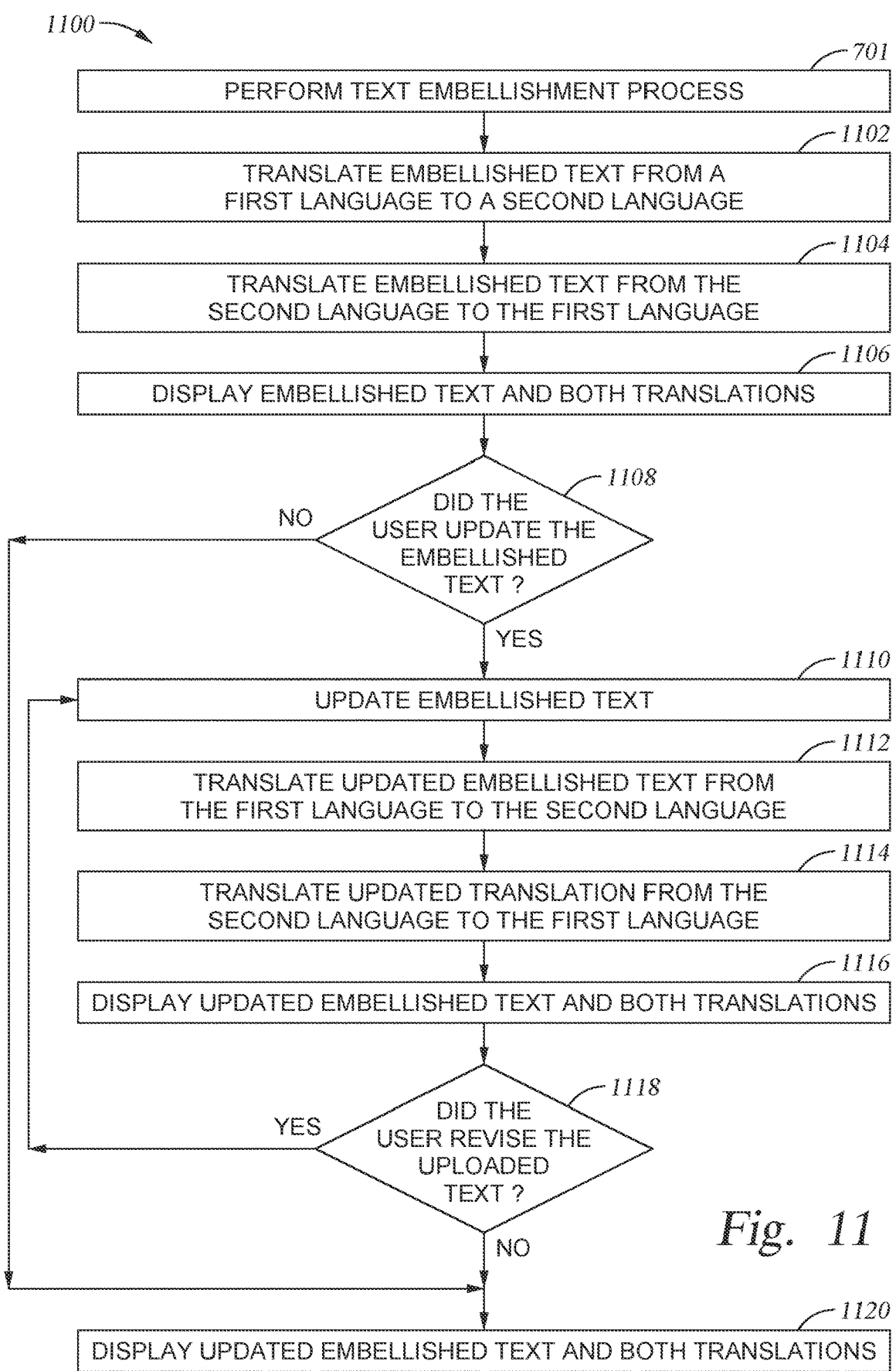
FIG. 11 illustrates a method of converting audible information to text, identifying potential incorrectly converted words, and translating the text from a first language to a second language according to certain embodiments.
Figure 12:
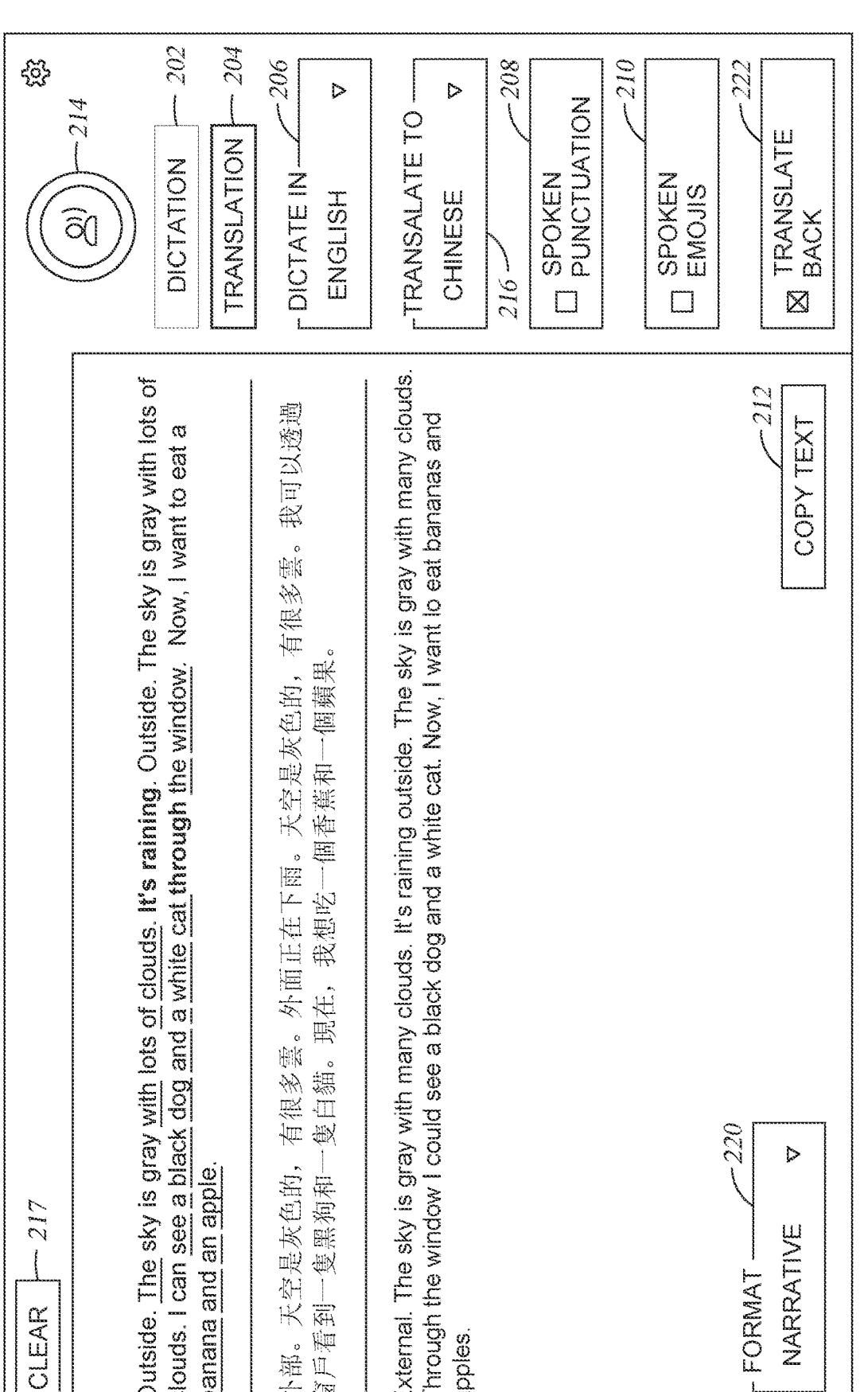
FIG. 12 illustrates a GUI displaying embellished text transcribed from audible information including embellished words that may have been incorrectly transcribed, and embellished words and two translations of the embellished text according to certain embodiments.

FIG. 11 illustrates a method of transcribing audible information to text, identifying potential incorrectly transcribed words, and translating the text from a first language to a second language according to certain embodiments, and then translate the translated text back into the original audible information language. FIG. 12 illustrates a GUI 200 displaying embellished text transcribed from audible information including embellished words that may have been incorrectly transcribed, translated text, and text that is retranslated by translating the translated text back into the original language.

At activity 701 the text embellishment process described above is performed. As illustrated in FIG. 12, since the translation prompt 204 is selected, the dictation language is English and the translate to language is Chinese in this example.

At activity 1102, a the third server program running on the third device 133 translates the first text data from a first language (e.g., English) to a second language (e.g., Chinese), saves the translated text as a third text data and transmits the third text data back to the computer 120.

As explained above, current translation servers are unable to identify idioms or situations where a word takes on a different meaning based on context (mononyms). Typically, a user 51 requiring text to be translated is not able to read and/or understand the second (translate to) language. Thus, the user 51 is not able to recognize errors in the translation.

Therefore, the user 51 may request a re-translation of the translated text by checking the translate back prompt 222 (FIG. 12).

Therefore, at activity 1104, because the translate to prompt 222 is checked, the third text data is transmitted to the third device 133. The third text data may be provided by the computer 120. The fourth server program running on the third device 133 translates the third text data from the second language (translate to language) back to the first language (dictate in language) and saves the translation as a fourth text data. This allows the user 51 to see the translation in a language they understand to evaluate if there are errors in the original translation.

At activity 1106, the processor displays the embellished text, the third text data and the fourth text data within the GUI 200 generated on the display 129. In certain embodiments, the program 123 may embellish the words or phrases in the fourth text data in the same manner discussed above, to highlight the differences between the original input text contained in the first text data and the translation back to the original language contained in the fourth text data.

At activity 1108, the user 51 has an opportunity to correct the translation or transcription errors in the embellished text. For example, the dictated word "outside" was translated to the word "external." Translating back to the dictated language allows the user 51 to update the first text data to ensure that the translation (e.g., third text data) is correctly translated. If the user corrects the embellished text for any reason, the method proceeds to activities 1110 through 1116.

At activity 1110, the first text data is updated by the first device 131 to reflect the changes in the embellished text.

At activity 1112, the updated first text data is transmitted by the computer 120 to the third device 133. The third server program running on the third device 133 updates the third text data by translating the updated first text data to the second language and transmitting the updated third text data back to the computer 120.

At activity 1114, the third device 133 receives the updated third text data from the computer 120 and the fourth server program running on the third device 133 updates the fourth text data by translating the updated third text data back to the first language.

At activity 1116, the updated translations (e.g., first, third and fourth text data) are redisplayed.

At activity 1118, the user 51 has the opportunity to revise the updated text. If the user 51 makes any revisions, the method repeats activities 1110-1116.

On the other hand, at activity 1118 if the user 51 indicates there are no errors remaining (by selecting copy text) the method proceeds to activity 1120 and the program 123 transmits the translation (e.g., third text data) is transmitted to the to the computer's 120 clipboard for pasting into the application currently accessed by the user 51.

On the other hand, at activity 1108 if the user 51 indicated there were no errors (by selecting copy text) the method skips to activity 1120 and the translation (e.g., third text data) is transmitted to the computer's 120 clipboard for pasting.

Transforming Text Process Examples

To improve the communicative and expressive properties of the generated alphanumeric data provided by a user, the program 123 may further transform information into a desired format based on information received by the program 123 and/or the software application currently accessed by the user. Advantageously, this creates a more userfriendly program 123 because the user can dictate text that is then transformed directly into a desired format. The method(s) described herein can thus be used by a user to reduce the user's time and reduce the user's hassle associated with the formatting of the dictated text.

Figure 13:
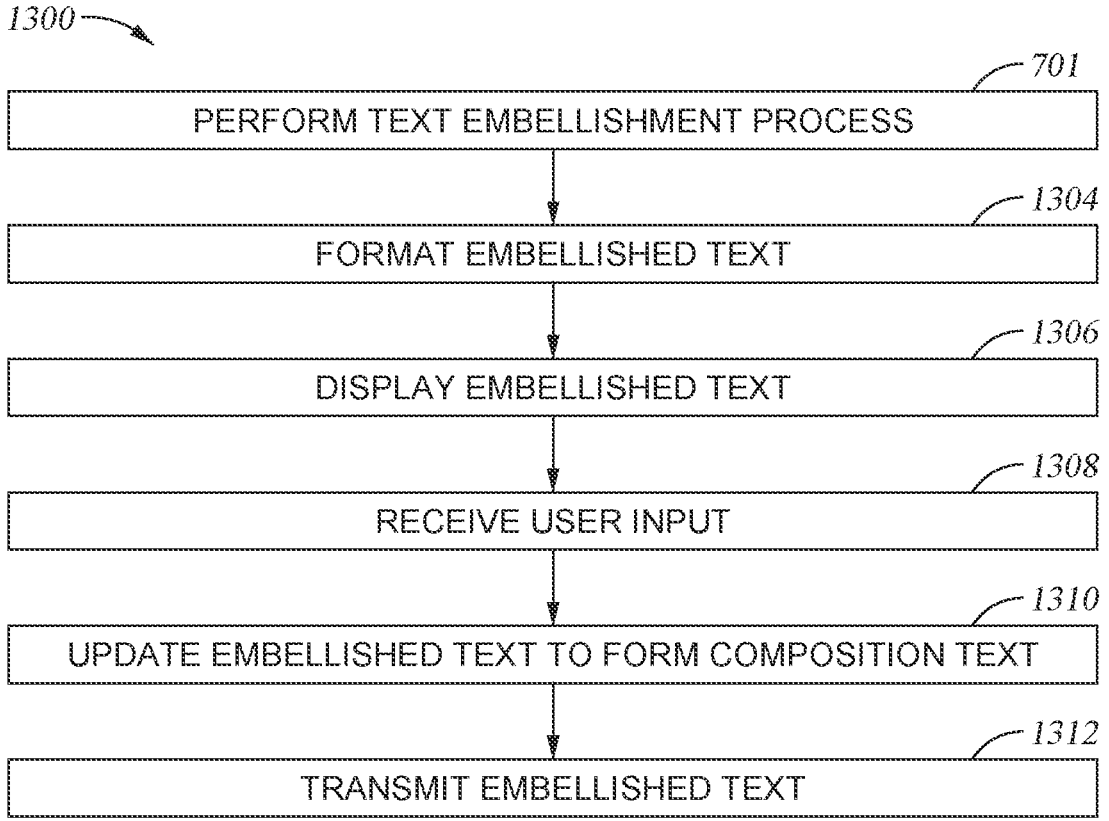
FIG. 13 illustrates a method of transcribing audible information to text, identifying potential incorrectly converted words, and formatting the text according to certain embodiments.
Figure 14A:
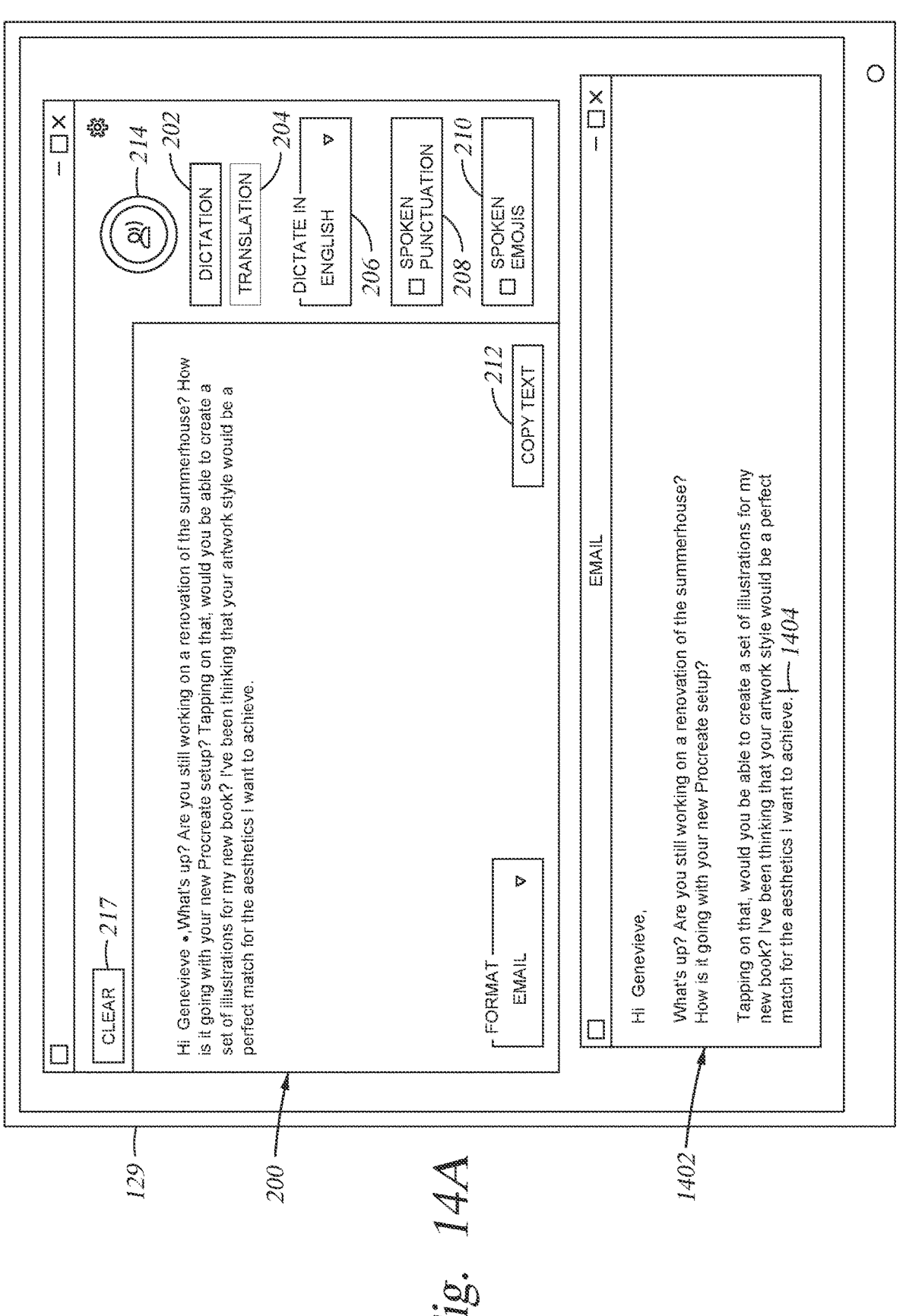
FIGS. 14A-14B illustrate a GUI displaying formatted embellished transcribed text.
Figure 14B:
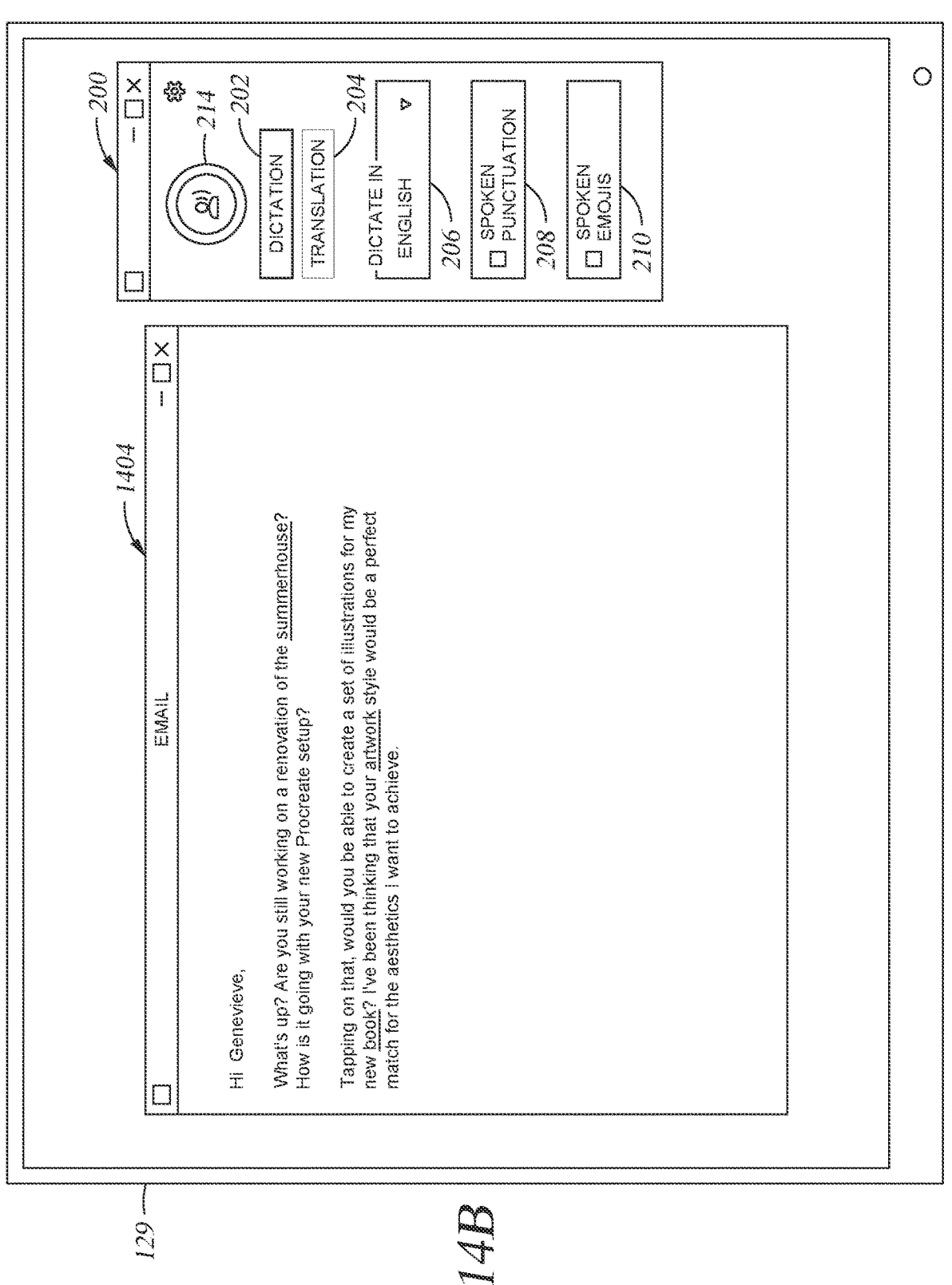

FIG. 13 illustrates a method of transcribing audio to text, identifying potential incorrectly converted words, and formatting the text according to certain embodiments. FIGS. 14A-14B illustrate a GUI 200 displaying formatted embellished transcribed text. At the start of method 1300, activity 701 is performed as described above.

At activity 1304 the program 123 may format the embellished text. In certain embodiments, the program 123 may format the embellished text automatically based on the program being currently accessed by the user 51. For example, as illustrated in FIG. 14A, the cursor 1404 is located in an email application 1402 prior to pressing the record prompt 214. Therefore, the program 123 makes a determination that the user is writing an email and formats the embellished text as an email, as shown in FIG. 14A. Although text formatted for an email application is described, the program 123 is able to format the embellished text based on a software application being currently accessed by the user 51, such as a word processing application, a chat application, a slideshow application, or the like. In some embodiments, the software application being currently accessed by the user 51 is running in the foreground, or in the background, on the computer 120.

Alternatively or additionally, the user 51 may indicate the desired format of the text to the program 123 using a drop down menu included in the format prompt 220 of the GUI 200.

At activity 1306, the processor displays the embellished text on the display 129.

At activity 1308, the computer 120 receives a second user input. The second user input may be the user selecting an emoji from an emoji list, a word from a related words list, or a word or an emoji from a combined related words and emoji list.

At activity 1310, after receiving user input, the text may be updated from embellished text to composition text. In certain embodiments, the user 51 may select the copy text prompt 212, indicating to the program 123 that the user 51 has completed the second user input. The program 123 may remove any of the embellishments from the text, forming composition text.

At activity 1312, the composition text may be pasted into a software application, such as a word processing software, a web based application such as an email, a slideshow presentation application, a chat application or the like.

In some embodiments, instead of performing activity 701 at the start of method 1300, the program 123 is used to format text received from another source. For example, a user 51 may type, using a keyboard, unformatted text intended to be placed in an email. The program 123 based on the context of the unformatted text, may automatically format the text into an email format, or the user 51 may indicate the desired format of the text using the format prompt 220 of the GUI 200. In one example, based on alphanumeric information received in a first file, which includes unformatted text or alternately formatted text, the program 123 is configured to automatically alter the format of the received information so that it can be placed in a word processing program, printed and sent as a business letter based on contextual information or an indication of a desired format provided by the user. In another example, based on alphanumeric information received from input on a keyboard or in a document, which includes unformatted text or alternately formatted text, the program 123 is configured to alter the format of the received information so that the formatted text can be automatically placed, or semi-automatically placed (e.g., copied from the program 123 and pasted in the application program), in a formatted presentation based on a presentation program being open of the computer 120.

Alternatively, as illustrated in FIG. 14B, text may be dictated, displayed, embellished, and formatted directly within an application being accessed by the user 51. For example in dictation mode, dictated text may be directly displayed in the email application 1402. If the program 123 is in translation mode, the third text data (the translated text) will be formatted directly in the application being accessed by the user.

Figure 16:
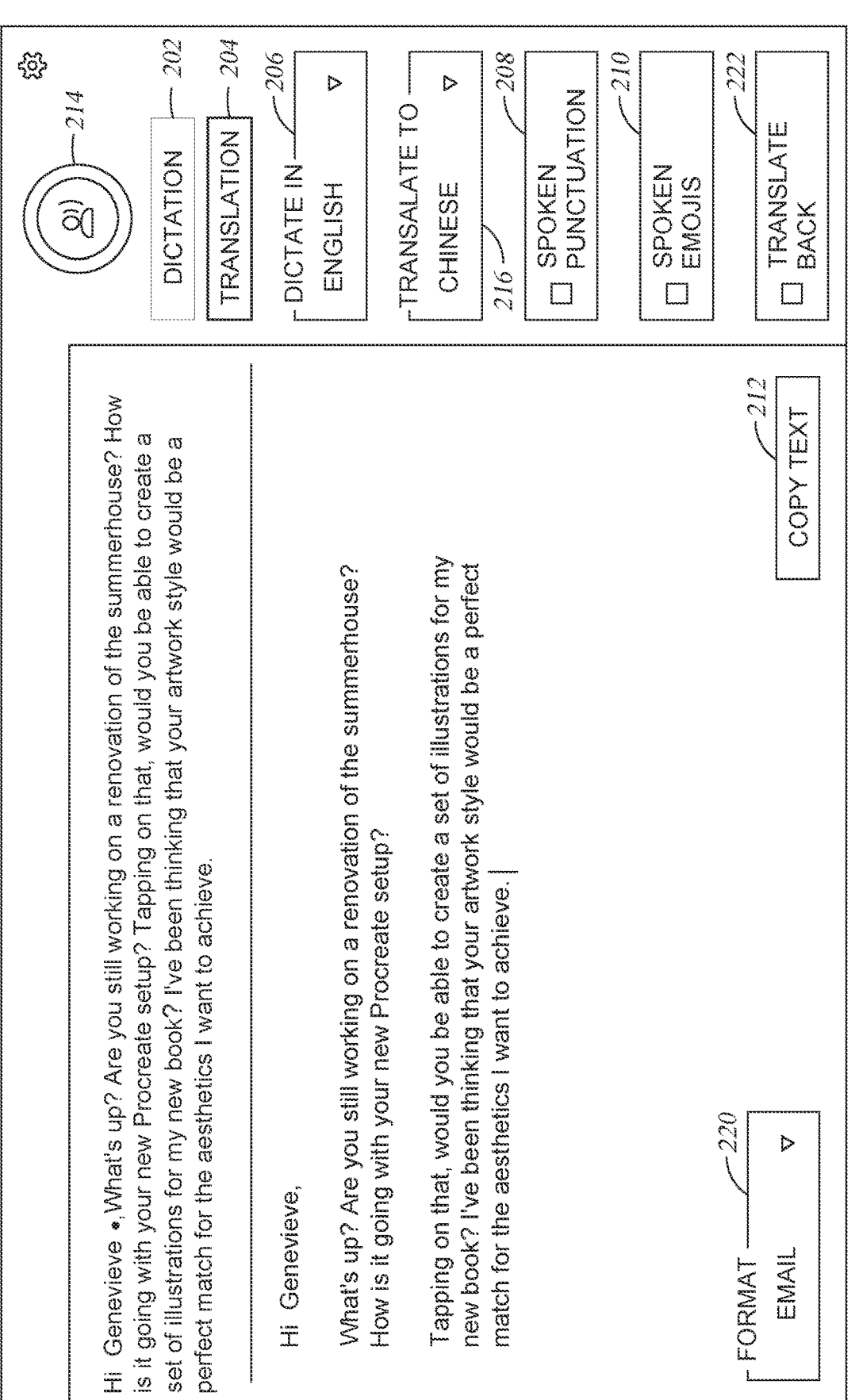
FIG. 16 illustrates a GUI 200 displaying the text translated into a format.

FIG. 15 illustrates a method of transforming information into a desired format, which can include converting audible information or data received from a user into the desired format, according to certain embodiments. FIG. 16 illustrates a GUI 200 displaying the text transformed into a desired format. At the start of method 1500, activity 701 is performed as described above.

At activity 1502, a first program running on a first computer receives a first text data set including alphanumeric information that comprises a plurality of words in a first language. In certain embodiments, as described above, the first text data set may be generated by the program 123 transcribing audio data received by audio assembly 115 into text. Alternatively, the program 123 may cause the audio data to be transferred to the first device 131, the first device 131 may convert the audio data into text, and the program 123 may receive the first text data set from the first device 131.

At activity 1504, the program 123 may reformat the first text data set to form a second text data set. The program 123 may reformat the first text data set by changing the spatial relationship between and/or visual characteristic of at least two words in the first text data set. For example, translating the embellished text into formatted text may include adding vertical (line) spaces between lines of text, adding tabs to text, separating the text into bullet points, or the like. For example, as illustrated in FIG. 16, the program 123 may translate the first text data set into email format. In another example, the program 123 may generate a formatted text into bullet points to be used in a slideshow application. In certain embodiments, the program 123 may generate the formatted text automatically. The program 123 is able to format the embellished text based on any software application being currently accessed by the user 51, such as a word processing application, a chat application, a slideshow application, or the like. Alternatively, in some embodiments, the text data may be formatted without, or prior to, embellishing the text data.

Alternatively or additionally, the user 51 may indicate the desired format of the text to the program 123 using a drop down menu included in the format prompt 220 of the GUI 200.

In certain embodiments, the program 123 may format the first text data set automatically based on the program being currently accessed by the user 51. For example, as illustrated in FIG. 16, if the user 51 is accessing an email application prior to pressing the record prompt 214, the program 123 will transform the embellished text into an email format without direction from the user 51.

At activity 1506, the program 123 simultaneously displays the first text data set and the second text data set on the display 129, as illustrated in FIG. 16.

In certain embodiments, each of the methods described above may be combined with one another or may be separately performed. For example, text dictated by a user may be transcribed, embellished, translated, and formatted. For example when in translate mode, the translated text may be formatted in the same manner as the embellished text.

While the foregoing is directed to embodiments of the present disclosure, other and further embodiments of the disclosure may be devised without departing from the basic scope thereof, and the scope thereof is determined by the claims that follow.

What is claimed is:

1. A method of transcribing, comprising:
receiving, by a computer implemented program implemented on a first electronic device, first text data and metadata associated with the first text data, wherein the first text data comprises alphanumeric information that comprises a plurality of words in a first language;
determining that two or more words of the plurality of words in the first text data have a quality score less than a threshold quality score, and the two or more words of the plurality of words have a different quality score less than the threshold quality score; streaming, by the computer implemented program, second text data to a second electronic device and streaming the first text data and the second text data to the first electronic device, wherein the streaming the second text data comprises altering in at least two different embellished types, by the computer implemented program, the two or more of the plurality of words of the first text data based on a comparison between at least two of the plurality of words of the first text data and metadata with information stored in a database, wherein the information stored in the database comprises a list of words or phrases that are to be altered based on the quality score when presented in a stream of words, and wherein the information stored in the database comprises a list of baseline offensive language and baseline metadata, and wherein the database is updated by an external source; and
displaying, by the computer implemented program, the first and second text data on a display of the first electronic device.

2. The method of claim 1, wherein a moderator monitoring a conversation between a first user operating the first electronic device and a second user operating the second electronic device.

3. The method of claim 1, wherein the second text data comprises at least one word or phrase of the plurality of words that is replaced by an emoji, bolded, italicized, underlined, highlighted, capitalized, or blurred, and wherein at least one of the at least one word or phrase is offensive or derogatory language.

4. The method of claim 3, wherein the computer implemented program alters the plurality of words based on settings specified by a user operating the second electronic device, and wherein the user specifies whether the at least one word or phrase of the plurality of words are altered by at least one of bolding, italicizing, underlining, highlighting, capitalizing, blurring, or replaced by an emoji.

5. The method of claim 1, further comprising translating the plurality of words into a second language, wherein the second language is a spoken language or a symbolic language.

6. The method of claim 2, wherein the metadata provides contextual information provided in the alphanumeric information, and wherein the metadata comprises video data collected while receiving the text data that includes facial expressions, movement, or body language of the first user associated with each of the plurality of words.

7. The method of claim 1, further comprising determining that one or more of the plurality of words of the first text data have a quality score less than a threshold quality score and displaying the one or more words of the plurality of words in a different manner based on the quality score.

8. A method of transcribing, comprising:
receiving, by a computer implemented program implemented on a first electronic device, first text data and metadata associated with the first text data, wherein the first text data comprises alphanumeric information that comprises a plurality of words in a first language;
determining that two words of the plurality of words in the first text data have a quality score less than a threshold quality score, and the two words of the plurality of words have a different quality score less than the threshold quality score;
streaming, by the computer implemented program, second text data to a second electronic device and streaming the first text data and the second text data to the first electronic device, wherein the streaming the second text data comprises altering, by the computer implemented program, the one or more of the plurality of words of the first text data based on a comparison between at least one of the plurality of words of the first text data and metadata with information stored in a database and translating the plurality of words of the first text data to a second language;
streaming, by the computer implemented program, third text data to the first electronic device, the third text data comprising the second text data translated back into the first language, wherein the third text data further comprises the two words of the plurality of words of the first text data having the quality score less than the threshold score and the two words comprise different embellishment types based on the quality score; and
displaying, by the computer implemented program, the first, second, and third text data on a display of the first electronic device.

9. The method of claim 8, wherein a moderator monitoring a conversation between a first user operating the first electronic device and a second user operating the second electronic device.

10. The method of claim 9, wherein the computer implemented program alters the altered one or more plurality of words based on settings specified by the second user, and wherein the second user specifies whether the plurality of words are altered by at least one of bolding, italicizing, underlining, highlighting, capitalizing, blurring, or replaced by an emoji.

11. The method of claim 9, wherein the metadata provides contextual information provided in the alphanumeric information, and wherein the metadata comprises video data collected while receiving the first text data that includes facial expressions, movement, or body language of the first user associated with each of the plurality of words.

12. The method of claim 8, wherein the computer implemented program alters one or more of the plurality of words based on a comparison between the first text data and metadata and information stored in the database, and wherein the information stored in the database comprises a list of baseline offensive language and baseline metadata.

13. The method of claim 8, wherein the altered one or more plurality of words comprises at least one word or phrase of the plurality of words that is replaced by an emoji, bolded, italicized, underlined, highlighted, capitalized, or blurred, and wherein at least one of the altered one or more of the plurality of words is offensive or derogatory language.

14. The method of claim 8, wherein the second language is a spoken language or a symbolic language.

15. A method of transcribing, comprising:

receiving, by a computer implemented program implemented on a first electronic device, first text data and metadata associated with the first text data, wherein the first text data comprises alphanumeric information that comprises a plurality of words in a first language;

streaming, by the computer implemented program, second text data to a second electronic device and streaming the first text data and the second text data to the first electronic device, wherein the streaming the second text data comprises altering, by the computer implemented program, two or more of the plurality of words of the first text data based on a comparison between at least two of the plurality of words of the first text data and metadata with information stored in a database, wherein the information stored in the database comprises a list of words or phrases that are to be altered when presented in a stream of words, and wherein the list of words or phrases that are to be altered have a have a quality score less than a threshold quality score, and wherein of the list of words or phrases that are to be altered, two or more of the plurality of words are to be altered in two or more different embellished types based on the quality score; and displaying, by the computer implemented program, the first and second text data on a display of the first electronic device.

* * * * *